(12) United States Patent
Walker, Jr. et al.

(10) Patent No.: US 10,442,967 B2
(45) Date of Patent: Oct. 15, 2019

(54) CHEMICAL RESISTANT MICROSPHERE ARTICLES

(71) Applicant: 3M INNOVATIVE PROPERTIES COMPANY, St. Paul, MN (US)

(72) Inventors: Christopher B. Walker, Jr., St. Paul, MN (US); Abdullahi A. Mohamud, Minnetonka, MN (US); Mary M. Caruso Dailey, Maplewood, MN (US); Benjamin G. Sonnek, Mahtomedi, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 15/748,267

(22) PCT Filed: Aug. 12, 2016

(86) PCT No.: PCT/US2016/046686
§ 371 (c)(1),
(2) Date: Jan. 29, 2018

(87) PCT Pub. No.: WO2017/027774
PCT Pub. Date: Feb. 16, 2017

(65) Prior Publication Data
US 2018/0223142 A1    Aug. 9, 2018

Related U.S. Application Data

(60) Provisional application No. 62/204,416, filed on Aug. 12, 2015.

(51) Int. Cl.
*B32B 3/00* (2006.01)
*C09J 175/04* (2006.01)
(Continued)

(52) U.S. Cl.
CPC .......... *C09J 175/04* (2013.01); *B29C 51/002* (2013.01); *B29C 71/04* (2013.01); *B32B 3/00* (2013.01);
(Continued)

(58) Field of Classification Search
CPC ......... B29C 51/002; B29C 71/04; B32B 3/00; B32B 3/08; B32B 3/10; B32B 3/14;
(Continued)

(56) References Cited

U.S. PATENT DOCUMENTS 4,107,391 A   8/1978 Moore
4,198,465 A   4/1980 Moore
(Continued)

FOREIGN PATENT DOCUMENTS

EP          0386297        9/1990
WO    WO 2015/092005 A1   6/2015

OTHER PUBLICATIONS

International Search Report for PCT International Application No. PCT/US2016/046686, dated Oct. 28, 2016, 5 pages.

*Primary Examiner* — Elizabeth E Mulvaney
(74) *Attorney, Agent, or Firm* — Qiang Han

(57) ABSTRACT

There is provided an article having at least a first surface having: a binder resin layer comprising an actinic radiation reactive polyurethane dispersion, where the binder resin layer has a first major surface opposite a second major surface; and a plurality of microspheres partially embedded and adhered to the first major surface of the binder resin layer. There is also provided a thermoset article derived from such thermoformable articles.

19 Claims, 1 Drawing Sheet

(51) Int. Cl.

| | | |
|---|---|---|
| B32B 7/00 | (2019.01) | |
| B32B 7/02 | (2019.01) | |
| B32B 7/04 | (2019.01) | |
| B32B 9/00 | (2006.01) | |
| B32B 9/04 | (2006.01) | |
| B32B 15/00 | (2006.01) | |
| B32B 15/04 | (2006.01) | |
| B32B 15/08 | (2006.01) | |
| B32B 15/095 | (2006.01) | |
| B32B 27/00 | (2006.01) | |
| B32B 27/06 | (2006.01) | |
| B32B 27/08 | (2006.01) | |
| B32B 27/16 | (2006.01) | |
| B32B 27/18 | (2006.01) | |
| B32B 27/26 | (2006.01) | |
| B32B 27/28 | (2006.01) | |
| B32B 27/30 | (2006.01) | |
| B32B 27/40 | (2006.01) | |
| B32B 3/02 | (2006.01) | |
| B32B 3/08 | (2006.01) | |
| B32B 3/10 | (2006.01) | |
| B32B 3/14 | (2006.01) | |
| B29C 51/00 | (2006.01) | |
| B29C 71/04 | (2006.01) | |
| C09J 175/14 | (2006.01) | |
| B29K 75/00 | (2006.01) | |
| B29K 105/16 | (2006.01) | |

(52) U.S. Cl.
CPC ................ *B32B 3/02* (2013.01); *B32B 3/08* (2013.01); *B32B 3/10* (2013.01); *B32B 3/14* (2013.01); *B32B 7/00* (2013.01); *B32B 7/02* (2013.01); *B32B 7/04* (2013.01); *B32B 9/00* (2013.01); *B32B 9/04* (2013.01); *B32B 15/00* (2013.01); *B32B 15/04* (2013.01); *B32B 15/08* (2013.01); *B32B 15/095* (2013.01); *B32B 27/00* (2013.01); *B32B 27/06* (2013.01); *B32B 27/08* (2013.01); *B32B 27/16* (2013.01); *B32B 27/18* (2013.01); *B32B 27/26* (2013.01); *B32B 27/28* (2013.01); *B32B 27/30* (2013.01); *B32B 27/308* (2013.01); *B32B 27/40* (2013.01); *C09J 175/14* (2013.01); *B29K 2075/00* (2013.01); *B29K 2105/16* (2013.01); *B32B 2255/00* (2013.01); *B32B 2255/10* (2013.01); *B32B 2255/20* (2013.01); *B32B 2260/00* (2013.01); *B32B 2264/00* (2013.01); *B32B 2264/10* (2013.01); *B32B 2264/101* (2013.01); *B32B 2307/40* (2013.01); *B32B 2307/536* (2013.01); *B32B 2307/538* (2013.01); *B32B 2307/554* (2013.01); *B32B 2307/584* (2013.01); *B32B 2307/71* (2013.01); *B32B 2307/712* (2013.01); *B32B 2307/738* (2013.01); *B32B 2451/00* (2013.01); *B32B 2457/00* (2013.01); *B32B 2509/00* (2013.01); *B32B 2605/00* (2013.01); *B32B 2605/003* (2013.01)

(58) Field of Classification Search
CPC .... B32B 7/00; B32B 7/02; B32B 7/04; B32B 27/16; B32B 27/18; B32B 27/26; B32B 27/28; B32B 27/40; C09J 175/04
See application file for complete search history.

(56) References Cited

U.S. PATENT DOCUMENTS

| | | |
|---|---|---|
| 4,393,187 A | 7/1983 | Boba |
| 4,849,265 A | 7/1989 | Ueda |
| 5,620,775 A | 4/1997 | LaPerre |
| 5,912,081 A | 6/1999 | Negele |
| 5,959,775 A | 9/1999 | Joseph |
| 5,993,588 A | 11/1999 | Nakamura |
| 6,156,436 A | 12/2000 | Joseph |
| 6,221,439 B1 | 4/2001 | Negele |
| 6,527,898 B1 | 3/2003 | Nakamura |
| 6,596,390 B1 | 7/2003 | Negele |
| 6,777,089 B1 | 8/2004 | Koeniger |
| 6,815,501 B2 | 11/2004 | Flosbach |
| 7,241,494 B2 | 7/2007 | Koeniger |
| 7,915,321 B2 | 3/2011 | Baumgart |
| 7,985,478 B2 | 7/2011 | Baumgart |
| 8,313,837 B2 | 11/2012 | Stine |
| 2006/0237124 A1 | 10/2006 | Bartoli |
| 2009/0269504 A1 | 10/2009 | Liao |
| 2010/0003523 A1 | 1/2010 | Sharygin |
| 2011/0183120 A1 | 7/2011 | Sharygin |
| 2014/0275394 A1 | 9/2014 | Allen |

CHEMICAL RESISTANT MICROSPHERE ARTICLES

CROSS REFERENCE TO RELATED APPLICATIONS

This application is a national stage filing under 35 U.S.C. 371 of PCT/US2016/046686, filed Aug. 12, 2016, which claims the benefit of U.S. Application No. 62/204,416, filed Aug. 12, 2015, the disclosure of which is incorporated by reference in its/their entirety herein.

FIELD

This disclosure relates to chemical resistant articles that are coated with microspheres or have microspheres embedded therein.

BACKGROUND

Decorative protective surfaces find many consumer applications. Household appliances, automotive interiors and paints, consumer electronic devices, such as laptops and hand held devices, are all examples where consumers prefer materials that deliver considerable protection from stains, scratches, wear and abrasion while retaining cosmetic and aesthetic appeal through the material's lifecycle.

Durable decorative laminates and films comprised of glass beads are broadly known. These low gloss constructions typically consist of exposed glass bead surfaces that impart high durability and decorative properties to the construction. For example, U.S. Pat. No. 4,849,265 (Ueda) discloses decorative abrasion resistant laminates that contain hard microspheres (glass or plastic) that are either exposed or surface coated with a thin polymer coating. Low friction properties of such constructions have also been disclosed. An example is U.S. Pat. No. 5,620,775 (LaPerre), which discloses durable, low coefficient of friction polymeric films made by having an exposed glass bead surface with glass. Specifically, bead films and low coefficient of friction decorative bead films are known in the art, but bead films which are chemical resistant to sunscreen and oxybenzone, and that also exhibit low coefficient of friction, good abrasion resistance, and sufficient hardness have not been described previously.

Thermoformable films are often prepared using polycarbonate as a substrate. Injection molding techniques often employ polycarbonate as a resin. However, polycarbonate is susceptible chemical and solvent attack.

There is a need for bead films having high temperature/humidity stain resistance to sunscreen as well as sunscreen components, (i.e. oxybenzone) that also have a low coefficient of friction, good abrasion resistance, and sufficient hardness. It would be further advantageous if such films were also thermoformable. It would be even further advantageous if these films incorporated polycarbonate in the substrate.

SUMMARY

The present disclosure provides an article comprising at least a first surface having: a binder resin layer comprising an actinic radiation reactive polyurethane dispersion, wherein the binder resin layer has a first major surface opposite a second major surface; and a plurality of microspheres partially embedded and adhered to the first major surface of the binder resin layer. In some embodiments, the article is thermoformable.

In some embodiments, the actinic radiation reactive polyurethane dispersion further comprises an actinically reactive crosslinker. In some embodiments, the actinically reactive crosslinker is selected from multi-functional acrylates. In some embodiments, the polyurethane dispersion is derived from a reaction product of polyester polyol, diisocyanates and triisocyanates, dihydroxy containing carboxylic acid. In some embodiments, the polyurethane dispersion has a pH of greater than or equal to 6.5. In some embodiments, the polyurethane dispersion has a pH of less than or equal to 10.0.

In some embodiments, the article further comprises a thermally activated crosslinker. In some embodiments, the thermally activated crosslinker is selected from at least one of polyisocyanate and polyaziridine.

In some embodiments, the article further comprises a photoinitiator. In some embodiments, the article further comprises at least one additive. In some embodiments, the at least one additive is selected from at least one of a thickening agent, wetting agent, UV stabilizer, leveling agent. In some embodiments, the article is thermally cured.

In some embodiments, the plurality of microspheres are selected from at least one of glass, polymers, glass ceramics, ceramics, metals and combinations thereof. In some embodiments, least about 60% of the surface of the article is covered with the plurality of microspheres. In some embodiments, the plurality of microspheres are substantially embedded in the binder resin layer.

In some embodiments, the article further comprises a reinforcing layer disposed along the second major surface of the binder resin layer. In some embodiments, the reinforcing layer comprises at least one of polyurethane resins, acrylic resins, polyester resins, epoxy resins, and combinations thereof. In some embodiments, the polyurethane material is selected from polyurethane dispersions, two part urethanes coated from solvent, 100% solids two part urethanes, and combinations thereof.

In another aspect, the present disclosure provides a thermoset article derived from the previously disclosed thermoformable article. In some embodiments, a thermoset article is derived from a thermoformable article comprising at least a first surface having: a binder resin layer comprising an actinic radiation reactive polyurethane dispersion, wherein the binder resin layer has a first major surface opposite a second major surface; a plurality of microspheres partially embedded and adhered to the first major surface of the binder resin layer; and a photoinitiator.

In some embodiments, the aforementioned thermoset articles are 3-dimensional shaped thermoset articles. In some embodiments, the thermoset article is cured using actinic radiation curing.

In some embodiments, the thermoset article exhibits a pencil hardness of greater than or equal to 9 H at 7.5 Newtons. In some embodiments, the thermoset article is resistant to sun screen. In some embodiments, the thermoset article exhibits a coefficient of friction of less than 0.3. In some embodiments, the thermoset article is resistant to oxybenzone.

In another aspect, the present disclosure provides a thermoset article is derived from a thermoformable article comprising at least a first surface having: a binder resin layer comprising an actinic radiation reactive polyurethane dispersion, wherein the binder resin layer has a first major surface opposite a second major surface; a plurality of microspheres substantially embedded and adhered to the first major surface of the binder resin layer. In some embodiments, this thermoset article has a gloss at 60 degrees of greater than 15. In some embodiments, the article used to derive this thermoset article further comprises a photoinitiator and a thermally activated crosslinker. In some embodiments, the thermally activated crosslinker is selected from at least one of polyisocyanate and polyaziridine. In some embodiments, the article used to derive the thermoset article further comprises at least one additive. In some embodiments, the at least one additive is selected from at least one of a thickening agent, wetting agent, UV stabilizer, leveling agent. In some embodiments, the article used to derive this thermoset article is thermally cured.

In another aspect, the present disclosure provides a thermoset article is derived from a thermoformable article comprising at least a first surface having: a binder resin layer comprising an actinic radiation reactive polyurethane dispersion, wherein the binder resin layer has a first major surface opposite a second major surface; a plurality of microspheres substantially embedded and adhered to the first major surface of the binder resin layer. In some embodiments, this thermoset article has a gloss at 60 degrees of greater than 15. In some embodiments, the article used to derive this thermoset article further comprises a photoinitiator and an actinically reactive crosslinker. In some embodiments, the actinically reactive crosslinker is selected from multi-functional acrylates. In some embodiments, the article used to derive the thermoset article further comprises at least one additive. In some embodiments, the at least one additive is selected from at least one of a thickening agent, wetting agent, UV stabilizer, leveling agent.

In another aspect, the present disclosure provides a thermoset article is derived from a thermoformable article comprising at least a first surface having: a binder resin layer comprising an actinic radiation reactive polyurethane dispersion, wherein the binder resin layer has a first major surface opposite a second major surface; a plurality of microspheres substantially embedded and adhered to the first major surface of the binder resin layer. In some embodiment, this thermoset article has a gloss at 60 degrees of greater than 15. In some embodiments, the article used to derive this thermoset article further comprises a photoinitiator a thermal crosslinker, and an actinically reactive crosslinker. In some embodiments, the thermal crosslinker is selected from at least one of polyisocyanate and polyaziridine. In some embodiments, the actinically reactive crosslinker is selected from multi-functional acrylates. In some embodiments, the article used to derive the thermoset article further comprises at least one additive. In some embodiments, the at least one additive is selected from at least one of a thickening agent, wetting agent, UV stabilizer, leveling agent.

In another aspect, the present disclosure provides thermoformable articles with partially embedded microspheres, in which the binder resin comprises an actinic radiation reactive polyurethane dispersion, a photoinitiator a thermal crosslinker, and an actinically reactive crosslinker. In this aspect the binder resin may be first crosslinked by means of the thermal crosslinker when the binder resin is dried.

In another aspect, the thermally crosslinked thermoformable article may be thermoformed to provide a 3D shape to the thermally crosslinked article.

In another aspect, the dried, thermally crosslinked article may then be further crosslinked in a second crosslinking step by means of exposure to actinic radiation and reaction of the actinically reactive crosslinker to provide a thermoset article.

In a further aspect, the thermally crosslinked thermoformable article may be thermoformed to provide a 3D shape to the thermally crosslinked article and then further crosslinked in a second crosslinking step by means of exposure to actinic radiation and reaction of the actinically reactive crosslinker to provide a thermoset, thermoformed article.

The above summary of the present disclosure is not intended to describe each embodiment of the present invention. The details of one or more embodiments of the invention are also set forth in the description below. Other features, objects, and advantages of the invention will be apparent from the description and from the claims.

DETAILED DESCRIPTION

Figure 1A:
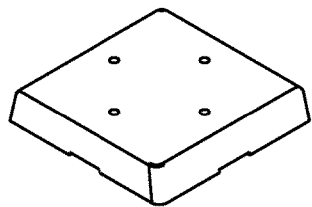
FIG. 1A is a front perspective view of one embodiment of a thermoset article according to the present disclosure.

Before any embodiments of the invention are explained in detail, it is to be understood that the invention is not limited in its application to the details of construction and the arrangement of components set forth in the following description. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Any numerical range recited herein includes all values from the lower value to the upper value. For example, if a concentration range is stated as 1% to 50%, it is intended that values such as 2% to 40%, 10% to 30%, or 1% to 3%, etc., are expressly enumerated. These are only examples of what is specifically intended, and all possible combinations of numerical values between and including the lowest value and the highest value enumerated are to be considered to be expressly stated in this application.

The term "partially embedded" as used herein means less than or equal to about 70% of the diameter of the microspheres is embedded in the binder resin layer as determined by a magnifying imaging system.

The term "substantially embedded" as used herein means greater than about 70% of the diameter of the microspheres is embedded in the binder resin layer as determined by a magnifying imaging system.

The terms "microspheres" and "beads" are used herein interchangeably.

The term "thermoformable" as used herein means an article which may be provided with a three dimensional (also referred to herein as "3D") shape by means of a thermoforming process.

The term "thermoset" as used herein means an article which has been crosslinked by exposure to actinic radiation.

The presently disclosed thermoformable articles have at least a first surface having: a binder resin layer comprising an actinic radiation reactive polyurethane dispersion, wherein the binder resin layer has a first major surface opposite a second major surface; and a plurality of microspheres partially embedded and adhered to the first major surface of the binder resin layer. The present disclosure also provides thermoset articles made using these thermoformable articles.

In some embodiments, the binder resin layer is based on a water based polyurethane dispersion blended with a multifunctional acrylate that is subsequently mixed with a thickener, a flow agent, a photoinitiator and a crosslinker for urethane dispersions.

Surprisingly, the presently disclosed articles are a barrier to sunscreen or the most aggressive of the individual components of sunscreens under 3 day heat and humidity (65° C./80% RH) testing conditions, such that a polycarbonate substrate layer used in the presently disclosed articles and thermoset articles remains unblemished when exposed to sunscreen and sunscreen components, such as oxybenzone. In addition, solvent resistance of the presently disclosed thermoset articles is good, pencil hardness is high, and the low COF films have resulted. The presently disclosed articles and thermoset articles are decorative articles, employing low index beads. The presently disclosed thermoset articles have embedded microspheres in the undercoat, while the coatings are continuous below the microspheres.

In principle, a variety of binder chemistries might work for the initial coating on bead liner, and a number of actinic radiation curable chemistries are possible for the $2^{nd}$ cure. Free radical polymerization and cationic polymerization are common actinic radiation curable chemistries, of which the free radical has been illustrated here to date.

The presently disclosed articles are prepared by coating a first layer (referred to as an undercoat) on a bead liner (or bead carrier) followed by additional thermoformable coating layers to make an intermediate construction. Lamination of substrates (e.g. polycarbonate) or adhesives to the intermediate construction followed by removal of the liner provides microsphere articles that may be used in different thermoforming processes. In mold decoration (IMD) is a thermoforming process that requires a substrate, most often polycarbonate, whereas dual vacuum thermoforming (DVT) is an example of a forming process that requires an adhesive and typically does not require a substrate. Often the DVT process applies a decorative film to a 3d shaped article made from polycarbonate.

It is desirable for thermoset articles derived from the presently disclosed articles to be resistant to sunscreen and sunscreen components, such as oxybenzone, when exposed to high temperature and humidity conditions. For example, the presently disclosed thermoset article should protect a substrate, such as polycarbonate, used therein such that after being exposed to sunscreen or oxybenzone for 3 days at a temperature of 65° C. and relative humidity of 80 RH, the sunscreen or sunscreen component does not come into contact with the substrate, preventing warping and blistering of the thermoset article.

Desired durability criteria for the presently disclosed thermoset articles are a low coefficient of friction, which affects the feel of the surface of the article and its aesthetic appeal, good abrasion resistance so as to be wear resistant, and sufficient hardness to resist deformation. Coefficient of friction values of less than or equal to 0.3 are desirable for some embodiments of the present disclosure. Pencil hardness values of, for example, of 3 H at a force of 5 Newtons, or 1 H at a force of 7.5 Newtons, or harder, are desirable for some embodiments of the present disclosure. In some embodiments, the pencil hardness is greater than or equal to 9 H at a force of 7.5 Newtons. In some embodiments, when the microspheres are substantially embedded in the binder resin layer, the presently disclosed thermoset articles have a gloss at 60 degrees of greater than 15.

Articles made according to the present disclosure are preferably thermoformable articles. In some embodiments, these articles are thermoset articles. The present disclosure contemplates thermoformable and/or thermoset articles useful across a range of shapes, sizes, and configurations. In some embodiments, the thermoformable and/or thermoset articles are substantially flat. In the course of thermoforming, some articles may be deformed and permanently strained or stretched. In some embodiments, the thermoformable and/or thermoset articles are 3 dimensional, such as, for example, a five side box. In some embodiments, the corners or edges can have sharp angles, such as 90 degree angles or higher. Without wishing to be bound by theory, it is believed that the strain on the materials used to make these types of 3 dimensional articles can range from 40 to 50% strain for a thermoformed shape, such as a box, having a height of 1.25 centimeters (0.5 inches). For a shape having a greater height, such as 3.8 centimeters (1.5 inches) the % strain would be expected to be even greater. Such strain results in a stretching of the binder resin layer and an increase in the distance between microspheres. In some embodiments useful in the present disclosure, the thermoformable and/or thermoset articles have more gradual contours, such as, for example, sloped or curved edges. Without wishing to be bound by theory, it is believed that the strain on these more gradual contoured 3 dimensional articles is lower than the aforementioned 3 dimensional articles. For example, strains in the range of 10 to 20% strain may be observed in articles having more gradual contours.

Previously taught constructions have not combined thermoformability and stain resistance to highly staining materials at elevated temperatures and humidity with low coefficient of friction surface and pencil hardness characteristics.

Transfer Carrier

The transfer coating method of the present disclosure can be used to form the presently disclosed microsphere transfer article from which can be formed the presently disclosed article. The article has a surprisingly improved aesthetics.

The presently disclosed transfer carrier includes a support layer and a thermoplastic release layer bonded thereto. The thermoplastic release layer of the transfer carrier temporarily partially embeds a plurality of transparent microspheres. The transfer carrier has low adhesion to the plurality of transparent microspheres and to the binder resin layer in which the opposite sides of the plurality of transparent microspheres are partially embedded, so that the transfer carrier can be removed to expose the surface of the plurality of transparent microspheres.

Support Layers

The support layer should be "dimensionally stable". In other words it should not shrink, expand, phase change, etc. during the preparation of the transfer article. Useful support layers may be thermoplastic, non-thermoplastic or thermosetting, for example. One skilled in the art would be able to select a useful support layer for the presently disclosed transfer article. If the support layer is a thermoplastic layer it should preferably have a melting point above that of the thermoplastic release layer of the transfer carrier. Useful support layers for forming the transfer carrier include but are not limited to those selected from at least one of paper and polymeric films such as biaxially oriented polyethylene terephthalate (PET), polypropylene, polymethylpentene and the like which exhibit good temperature stability and tensile so they can undergo processing operations such as bead coating, adhesive coating, drying, printing, and the like.

Thermoplastic Release Layers

Useful thermoplastic release layers for forming the transfer carrier include but are not limited to those selected from at least one of polyolefins such as polyethylene, polypropylene, organic waxes, blends thereof, and the like. Low to medium density (about 0.910 to 0.940 g/cc density) polyethylene is preferred because it has a melting point high enough to accommodate subsequent coating and drying operations which may be involved in preparing the transfer article, and also because it releases from a range of adhesive materials which may be used as the binder resin layer, in addition to the plurality of transparent microspheres.

The thickness of the thermoplastic release layer is chosen according to the microsphere diameter distribution to be coated. The binder resin layer embedment becomes approximately the complement image of the transfer carrier embedment. For example, a transparent microsphere which is embedded to about 30% of its diameter in the release layer of the transfer carrier is typically embedded to about 70% of its diameter in the binder resin layer. To maximize slipperiness and packing density of the plurality of microspheres, it is desirable to control the embedment process so that the upper surface of smaller microspheres and larger microspheres in a given population end up at about the same level after the transfer carrier is removed.

In order to partially embed the plurality of transparent microspheres in the release layer, the release layer should preferably be in a tacky state (either inherently tacky and/or by heating). The plurality of transparent microspheres may be partially embedded, for example, by coating a plurality of transparent microspheres on the thermoplastic release layer of the transfer carrier followed by one of (1)-(3):(1) heating the microsphere coated transfer carrier, (2) applying pressure to the microsphere coated transfer carrier (with, for example, a roller) or (3) heating and applying pressure to the microsphere coated transfer carrier.

For a given thermoplastic release layer, the microsphere embedment process is controlled primarily by temperature, time of heating and thickness of the thermoplastic release layer. As the thermoplastic release layer is melted, the smaller microspheres in any given population will embed at a faster rate and to a greater extent than the larger microspheres because of surface wetting forces. The interface of the thermoplastic release layer with the support layer becomes an embedment bounding surface since the microspheres will sink until they are stopped by the dimensionally stable support layer. For this reason it is preferable that this interface be relatively flat.

The thickness of the thermoplastic release layer should be chosen to prevent encapsulation of most of the smaller diameter microspheres so that they will not be pulled away from the binder resin layer when the transfer carrier is removed. On the other hand, the thermoplastic release layer must be thick enough so that the larger microspheres in the plurality of transparent microspheres are sufficiently embedded to prevent their loss during subsequent processing operations (such as coating with the binder resin layer, for example).

Microspheres

Microspheres useful in the present disclosure can be made from a variety of materials, such as glass, polymers, glass ceramics, ceramics, metals and combinations thereof. In some embodiments, the microspheres are glass beads. The glass beads are largely spherically shaped. The glass beads are typically made by grinding ordinary soda-lime glass or borosilicate glass, typically from recycled sources such as from glazing and/or glassware. Common industrial glasses could be of varying refractive indices depending on their composition. Soda lime silicates and borosilicates are some of the common types of glasses. Borosilicate glasses typically contain boria and silica along with other elemental oxides such as alkali metal oxides, alumina etc. Some glasses used in the industry that contain boria and silica among other oxides include E glass, and glass available under the trade designation "NEXTERION GLASS D" from Schott Industries, Kansas City, Mo., and glass available under the trade designation "PYREX" from Corning Incorporated, New York, N.Y.

The grinding process yields a wide distribution of glass particle sizes. The glass particles are spherodized by treating in a heated column to melt the glass into spherical droplets, which are subsequently cooled. Not all the beads are perfect spheres. Some are oblate, some are melted together and some contain small bubbles.

Microspheres are preferably free of defects. As used herein, the phrase "free of defects" means that the microspheres have low amounts of bubbles, low amounts of irregular shaped particles, low surface roughness, low amount of inhomogeneities, low amounts undesirable color or tint, or low amounts of other scattering centers.

Particle Sizing

The microspheres are typically sized via screen sieves to provide a useful distribution of particle sizes. Sieving is also used to characterize the size of the microspheres. With sieving, a series of screens with controlled sized openings is used and the microspheres passing through the openings are assumed to be equal to or smaller than that opening size. For microspheres, this is true because the cross-sectional diameter of the microsphere is almost always the same no matter how it is oriented to a screen opening. It is desirable to use as broad a size range as possible to control economics and maximize the packing of the microspheres on the binder layer surface. However, some applications may require limiting the microsphere size range to provide a more uniform microsphere coated surface. In some embodiments, a useful range of average microsphere diameters is about 5 µm to about 200 µm (typically about 35 to about 140 µm, preferably about 35 to 90 µm, and most preferably about 38 to about 75 µm). A small number (0 to 5% by weight based on the total number of microspheres) of smaller and larger microspheres falling outside the 20 to 180 micron range can be tolerated. In some embodiments, a multi-modal size distribution of microspheres is useful.

In some embodiments, to calculate the "average diameter" of a mixture of microspheres one would sieve a given weight of particles such as, for example, a 100 gram sample through a stack of standard sieves. The uppermost sieve would have the largest rated opening and the lowest sieve would have the smallest rated opening. For our purposed the average cross-sectional diameter can be effectively measure by using the following stack of sieves.

| U.S. Sieve Designation No. | Nominal Opening (microns) |
|---|---|
| 80 | 180 |
| 100 | 150 |
| 120 | 125 |
| 140 | 106 |
| 170 | 90 |
| 200 | 75 |
| 230 | 63 |
| 270 | 53 |
| 325 | 45 |
| 400 | 38 |

Alternately, average diameter can be determined using any commonly known microscopic methods for sizing particles. For example, optical microscopy or scanning electron microscropy, and the like, can be used in combination with any image analysis software. For example, software commercially available as free ware under the trade designation "IMAGE J" from NIH, Bethesda, Md.

Adhesion Promoter

In some embodiments, the microspheres are treated with an adhesion promoter such as those selected from at least one of silane coupling agents, titanates, organo-chromium complexes, and the like, to maximize their adhesion to the binder resin layer, especially with regard to moisture resistance.

The treatment level for such adhesion promoters is on the order of 50 to 1200 parts by weight adhesion promoter per million parts by weight microspheres. Microspheres having smaller diameters would typically be treated at higher levels because of their higher surface area. Treatment is typically accomplished by spray drying or wet mixing a dilute solution such as an alcohol solution (such as ethyl or isopropyl alcohol, for example) of the adhesion promoter with the microspheres, followed by drying in a tumbler or auger-fed dryer to prevent the microspheres from sticking together. One skilled in the art would be able to determine how to best treat the microspheres with an adhesion promoter.

Binder Resin Layer

The binder resin layer is an actinic radiation reactive polyurethane dispersion. The transparent microspheres are partially embedded in the first major surface of the binder resin layer and adhered thereto. The binder resin layer should exhibit good adhesion to the transparent microspheres themselves or to the treated microspheres. It is also possible that an adhesion promoter for the microspheres could be added directly to the binder resin layer itself as long as it is compatible within the process window for disposing the binder resin layer on the surfaces of the microspheres. It is important that the binder resin layer has sufficient release from the thermoplastic release layer of the transfer carrier to allow removal of the transfer carrier from the microspheres, which are embedded on one side in the thermoplastic release layer and on the other side in the binder resin layer. In some embodiments, the presently disclosed articles have microspheres that are partially embedded in the binder resin layer. In some embodiments, the presently disclosed articles have microspheres that are substantially embedded in the binder resin layer.

The binder resin layer of the present disclosure is selected such that the resulting articles exhibit resistance to sunscreen and sunscreen components at elevated temperature and humidity. Materials useful in the binder resin layer include those materials sold under the trade designations "Bayhydrol UV XP" and "Bayhydrol UV" commercially available from Bayer Material Science LLC, Pittsburgh, Pa.; "LUX 250" commercially available from Alberdingk Boley, Greensboro, N.C.; "Miwon Miramer WB 2812" commercially available from Miwon Specialty Chemical Co., Ltd., Korea; and "Ebecryl 4150" (previously "Desmolux D100") and "Ebecryl 4250" (formerly "Desmolux XP200"), both commercially available from Allnex. Acrylate functional polyols are also available from Allnex.

In some embodiments, in addition to the actinic radiation reactive polyurethane dispersion, the binder resin layer of the present disclosure may also contain additional dispersions that are not actinic radiation reactive for purposes of improving mechanical properties or reducing tackiness. Useful dispersions that are not actinic radiation reactive include those materials sold under the trade designation "ALBERDINGK U 9380" commercially available from Alberdingk Boley, Greensboro, N.C.

In some embodiments, the binder resin layer includes a crosslinker for use in thermal curing. Useful thermally activated crosslinkers include polyisocyanates, preferably water dispersible polyisocyanates, and polyaziridines. In some embodiments, blends of aziridines and water dispersible isocyanates are possible. Other crosslinkers, such as carbodiimides and blocked isocyanates, may also be used in the presently disclosed binder resin layer.

In some embodiments, the presently disclosed actinic radiation reactive polyurethane dispersion also a crosslinker for use in actinic radiation curing. Useful actinically reactive crosslinkers include multi-functional acrylates. A variety of different multi-functional acrylates are useful in the present disclosure. In some embodiments, it is desirable that the multi-functional acrylates used in the presently disclosed binder resin layer have a high level of functionality and relatively lower molecular weight. Exemplary multi-functional acrylates includes ethoxylated trimethylol propane triacrylate, trimethylol propane triacrylate, pentaerythritol tri/tetracrylate, dipentaerythritolpentaaacrylate, dipentaerythritolhexaacrylate, and Tris(2-hydroxy ethyl) isocyanurate triacrylate. While liquid multi-functional acrylates can be used, solid multi-functional acrylates, such as tris(2-hydroxy ethyl) isocyanurate triacrylate, can also be used in the presently disclosed actinic radiation reactive polyurethane dispersion. Exemplary multi-functional acrylates are sold by Sartomer Americas, Exton, Pa. and Miwon Specialty Chemical Co, Ltd. South Korea.

In some embodiments, the actinic radiation reactive polyurethane dispersion is derived from a reaction product of polyester polyol, diisocyanates and triisocyanates, dihydroxy containing carboxylic acid. In some embodiments, the actinic radiation reactive polyurethane dispersion has a pH of greater than or equal to 6.5. In some embodiments, the actinic radiation reactive polyurethane dispersion has a pH of less than or equal to 10.0.

Exemplary curing agents useful in the present disclosure include those having latent functionality in that there is at least one type of functionality present in the curing agent that polymerizes in a manner that does not interfere with and is stable in the presence of polymerization of at least one other type of functionality present in the curing agent. For example, curing agents useful in the present disclosure include molecules having at least some functionality useful for condensation curing and at least some functionality useful for free radical polymerization. Condensation polymerizations, such as those using isocyanates, are enhanced by heating. Free radically polymerizable groups, such as (meth) acrylates, are stable within a range of temperatures commonly used for condensation polymerization.

In some embodiments, a photoinitiator is used in the actinic radiation reactive polyurethane dispersion. For example, in some embodiments, curing is accomplished by actinic radiation curing of a thermoformed article. Exemplary actinic radiation curing includes curing by exposure of the thermoformed article to an ultra violet (UV) light source, an electron beam source, and the like. Various photoinitiators can be used in the presently disclosed thermoformed articles. In some embodiments, it is preferable to use photo initiators having longer wavelength absorption. In some embodiments, curing is accomplished by thermally initiated curing.

In some embodiments, the article further comprises at least one additive. In some embodiments, the at least one additive is selected from at least one of a thickening agent, wetting agent, UV stabilizer, leveling agent.

The binder resin layer may be transparent, translucent, or opaque. The binder resin layer may, for example, be clear and colorless or pigmented with opaque, transparent, or translucent dyes and/or pigments. In some embodiments, inclusion of specialty pigments, such as for example metallic flake pigments, can be useful.

The binder resin layer is typically formed on the transfer carrier after the transparent microspheres have been partially embedded in the release layer of the transfer carrier. The binder resin layer is typically coated over the partially embedded transparent microspheres by a direct coating process but could also be provided over the transparent microspheres via thermal lamination either from a separate carrier or by first forming the binder resin layer on a separate substrate from which it is subsequently transferred to cover the transparent microspheres.

In the presently disclosed transfer and microsphere coated articles, the plurality of transparent microspheres are typically disposed on the first major surface of the binder resin layer to provide sufficient pencil hardness and abrasion characteristics.

In some embodiments the binder resin layer is continuous such that there is no break either in the areas between, or beneath, the microspheres in the stain resistant articles of the invention. In another embodiment, the binder resin layer is continuous in the areas between the microspheres, although it may not be present beneath the microspheres in the stain resistant articles of the invention. In the latter embodiment the microspheres themselves are providing the desired stain resistant characteristics where the binder resin layer is absent.

Reinforcing Layers

The presently disclosed microsphere coated articles and transfer articles can optionally comprise one or more reinforcing layer(s). Examples of suitable reinforcing layers include polyurethanes resin systems, acrylic resin, polyester resins, and epoxy resins. Suitable polyurethane resin systems include, but are not limited to, those selected from at least one of: polyurethane dispersions, 2 part urethanes coated from solvent, and 100% solids 2 part urethanes. Suitable acrylic resin systems include, but are not limited to, those selected from UV-curable acrylic resin systems, thermally curable acrylic resin systems. Such systems may be solvent coated, aqueous dispersions, or hot melt coated. One suitable type of polyester resin are co-amorphous polyester resins. Suitable epoxy resin systems include, but are not limited to, those selected from at least one of two part and one part epoxy resins. Such reinforcing layers may be formed on the surface of the binder resin layer opposite that of the bead-containing transfer carrier. The reinforcing layer can serve to provide advantageous handling characteristics, and in doing so permit the use of thinner layers of binder resin.

Substrate Layers

The presently disclosed microsphere coated articles and transfer articles can optionally comprise one or more substrate layer(s). Examples of suitable substrate layers include but are not limited to those selected from at least one of fabrics (including synthetics, non-synthetics, woven and non-woven such as nylon, polyester, etc.), polymer coated fabrics such as vinyl coated fabrics, polyurethane coated fabrics, etc.; polymeric matrix composites; leather; metal; paint coated metal; paper; polymeric films or sheets such as acrylics, polycarbonate, polyurethanes such as thermoplastic polyurethanes, polyesters including amorphous or semi-crystalline polyesters such as polyethylene terephthalate, elastomers such as natural and synthetic rubber, and the like. The substrates may, for example, be in the form of a clothing article; automobile, marine, or other vehicle seat coverings; automobile, marine, or other vehicle bodies; orthopedic devices; electronic devices, hand held devices, household appliances, and the like.

The present disclosure also provides stain resistant articles which are thermoformable or stretchable. In order for the article to be thermoformable or stretchable, the materials in the article must have certain properties.

First, when the article is formed, the article must retain its formed dimensions. If the article has high elasticity, it can recover when the forming stresses are removed, essentially undoing the forming step. Therefore, high elasticity can be problematic. This issue can be avoided by using materials that undergo melt flow at or near the forming or stretching temperature. In other cases, a component of the article can have elasticity at the forming temperature, but this elasticity is likely to exert a recovery force after forming. To prevent this elastic recovery, the elastic layer can be laminated with a material that does not show this elasticity. For example, this inelastic material can be a thermoplastic material.

The other criterion for the article to be formable is that it can bear the elongation that occurs during forming or stretching without failing, cracking, or generating other defects. This can be achieved by using materials that have a temperature at which they undergo melt flow and conducting the forming step near that temperature. In some cases, crosslinked materials that do not flow can be used, but they are more likely to crack during the elongation. To avoid this cracking, the crosslink density should be kept low, as can be indicated by a low storage modulus in the rubbery plateau region. The expected degree of crosslinking can also approximated as the inverse of the average molecular weight per crosslink, which can be calculated based on the components of a material. In addition, it is preferred to do the forming at relatively low temperatures, since as temperatures increase above the glass transition temperature of crosslinked materials, their capacity for elongation begins to decrease.

Thermoformable materials suitable for use in articles of the present disclosure include polycarbonate, polyurethanes such as thermoplastic polyurethanes, and polyesters including amorphous or semi-crystalline polyesters such as polyethylene terephthalate.

Graphic Layer Options

The present disclosed binder resin layer can optionally also perform the function of acting as the adhesive for a desired substrate and/or further comprise pigment(s) such that it also has a graphic function.

The binder resin layer, when selected to function also as a substrate adhesive graphic image, may be, for example, pigmented and provided in the form of an image, such as, for example, by screen printing the binder resin in the form of a graphic for transfer to a separate substrate. However, the binder resin layer, in some instances, is preferably colorless and transparent so that it can allow transmission of color from either a substrate, separate graphic layers (discontinuous colored polymeric layers) placed below it, or from a separate substrate adhesive that is optionally colored and optionally printed in the form of a graphic image (a discontinuous layer).

Typically, if a graphic image is desired it is provided separately on the surface of the binder resin layer opposite the plurality of transparent microspheres by at least one colored polymeric layer. The optional colored polymeric layer may, for example, comprise an ink. Examples of suitable inks for use in the present disclosure include but are not limited to those selected from at least one of pigmented vinyl polymers and vinyl copolymers, acrylic and methacrylic copolymers, urethane polymers and copolymers, copolymers of ethylene with acrylic acid, methacrylic acid and their metallic salts, and blends thereof. The colored polymeric layer, which can be an ink, can be printed via a range of methods including, but not limited to screen printing, flexographic printing, offset printing, lithography, transfer electrophotography, transfer foil, and direct or transfer xerography. The colored polymeric layer may be transparent, opaque, or translucent.

A colored polymeric layer(s) may be included in the articles of the present disclosure by a number of procedures. For example, a transfer carrier can have a layer of transparent microspheres embedded in the release layer thereof, following which the microsphere embedded surface of the release layer is coated with a transparent layer of binder. This microsphere and adhesive coated transfer carrier can function as a casting liner by coating, for example, a continuous colored plasticized vinyl layer over the binder resin layer and wet laminating a woven or non-woven fabric thereover.

Another method involves providing graphic layers (discontinuous colored polymeric layers, for example) on the binder resin layer prior to casting a continuous colored plasticized vinyl layer to approximate the image of leather, for example.

Optional Adhesive Layer(s)

The presently disclosed microsphere coated article and transfer article may each optionally further comprise one or more adhesive layers. A substrate adhesive layer, for example, may optionally be included in the article in order to provide a means for bonding the binder layer or the layer(s) of material optionally bonded to the binder layers to a substrate. A substrate adhesive layer (as well as any other optional adhesive layers) may be selected from those generally known in the art such as, for example, pressure sensitive adhesives, moisture curing adhesives, and hot melt adhesives (i.e. those applied at elevated temperatures). Examples of such materials, include, for example, (meth) acrylics, natural and synthetic rubbers including block copolymers, silicones, urethanes, and the like. However, each adhesive layer used must be selected such that it will adhere the desired layers together. For example, a substrate adhesive layer must be selected such that it can adhere to an intended substrate as well as to the other layer to which it is bonded.

The optional adhesive layer, when present, may be continuous in some embodiments or discontinuous in some embodiments. Typically, the substrate layer, when present, is continuous, although it may be discontinuous. By continuous it is meant that within the outermost boundaries of the adhesive layer there are no areas left uncovered by the adhesive layer. Discontinuous means there may be areas present that are not covered by the adhesive layer. Such adhesive layers may be disposed on a surface opposite that of the first major surface of the binder resin layer.

Articles and thermoset articles of the present disclosure may comprise a binder resin layer only, or a binder resin layer in combination with one or more of a reinforcing layer, substrate layer, graphic layer, or adhesive layer.

In the articles and thermoset articles of the present disclosure the substrate layers, graphic layers, and adhesive layers, when present, may be disposed on a surface other than the first major surface of the binder resin layer. For example, such articles and thermoset articles may comprise a binder resin layer having a first and second major surface, a plurality of microspheres partially embedded in, and adhered thereto, the first major surface of the binder resin layer, a reinforcing layer having a first and second major surface which is formed with its' first major surface in contact with the second major surface of the binder resin layer, an adhesive layer having a first and second major surface with its' first major surface in contact with the second major surface of the reinforcing layer, and a substrate layer having a first and second major surface with its' first major surface in contact with the second major surface of the adhesive layer. Alternatively, the adhesive layer may be absent and the first major surface of the substrate layer may be in contact with the second major surface of the reinforcing layer.

For some applications, it can be desirable to obtain specific bead surface area coverages. In some embodiments, at least about 40% of the surface of the article is covered with the plurality of microspheres. In some embodiments, at least about 60% of the surface of the article or thermoset article is covered with the plurality of microspheres. In some embodiments, the article or thermoset article has at least a portion of a first major surface covered with the plurality of microspheres with coverage greater than or equal to 30% of that portion of the first major surface. In some embodiments, the article or thermoset articles has at least a portion of a first major surface covered with the plurality of microspheres with coverage less than or equal to 50% of that portion of the first major surface. In some embodiments, the percent of area covered by microspheres in one area of the film can be one coverage density, such as about 68%. In some embodiments, the percent of area covered by microspheres in another area of the film can be the same or different coverage density, such as 45%. In some embodiments, the percent of area covered by microspheres in yet another area of the film can be the same or different coverage density, such as 37%. In some embodiments, the presently disclosed articles and thermoset articles include a plurality of microspheres that are substantially uniformly spaced.

A non-limiting list of exemplary embodiments and combinations of exemplary embodiments of the present disclosure are disclosed below:

Embodiment 1

An article comprising at least a first surface having: (a) a binder resin layer comprising an actinic radiation reactive polyurethane dispersion, wherein the binder resin layer has a first major surface opposite a second major surface; and (b)

a plurality of microspheres partially embedded and adhered to the first major surface of the binder resin layer.

Embodiment 2

The article of Embodiment 1 wherein the article is thermoformable.

Embodiment 3

The article of Embodiment 1 or 2 wherein the polyurethane dispersion further comprises multi-functional acrylates.

Embodiment 4

The article of Embodiment 1 or 2 wherein the polyurethane dispersion is derived from a reaction product of polyester polyol, diisocyanates and triisocyanates, dihydroxy containing carboxylic acid.

Embodiment 5

The article of Embodiment 4 wherein the polyurethane dispersion has a pH of greater than or equal to 6.5.

Embodiment 6

The article of Embodiment 4 or 5 wherein the polyurethane dispersion has a pH of less than or equal to 10.0.

Embodiment 7

The article of any of the preceding Embodiments further comprising a crosslinker.

Embodiment 8

The article of Embodiment 7 wherein the crosslinker is selected from at least one of polyisocyanate and polyaziridine.

Embodiment 9

The article of any of the preceding Embodiments further comprising a photoinitiator.

Embodiment 10

The article of any of the preceding Embodiments further comprising at least one additive.

Embodiment 11

The article of any Embodiment 10 wherein the at least one additive is selected from at least one of a thickening agent, wetting agent, UV stabilizer, leveling agent, Embodiment 12

The article of Embodiment 7 or 8 wherein the article is thermally cured.

Embodiment 13

The article of the preceding Embodiments wherein the plurality of microspheres are selected from at least one of glass, polymers, glass ceramics, ceramics, metals and combinations thereof.

Embodiment 14

The article of any of the preceding Embodiments wherein at least about 60% of the surface of the article is covered with the plurality of microspheres.

Embodiment 15

The article of Embodiments 1 to 13 wherein the plurality of microspheres are substantially embedded in the binder resin layer.

Embodiment 16

The article of any of the preceding Embodiments further comprising a reinforcing layer disposed along the second major surface of the binder resin layer.

Embodiment 17

The article of Embodiment 16 wherein the reinforcing layer comprises at least one of polyurethane resins, acrylic resins, polyester resins, epoxy resins, and combinations thereof.

Embodiment 18

The article of Embodiment 17 wherein the polyurethane material is selected from polyurethane dispersions, two part urethanes coated from solvent, 100% solids two part urethanes, and combinations thereof.

Embodiment 19

A thermoset article derived from the thermoformable article of Embodiment 2 or 9.

Embodiment 20

The thermoset article of Embodiment 19 is a 3-dimensional shaped thermoset article.

Embodiment 21

The thermoset article of Embodiment 19 or 20 wherein curing is accomplished by actinic radiation curing.

Embodiment 22

The thermoset article of Embodiment 19 to 21 wherein the thermoset article exhibits a pencil hardness of greater than or equal to 9 H at 7.5 Newtons.

Embodiment 23

The thermoset article of Embodiment 19 to 22 wherein the thermoset article is resistant to sun screen.

Embodiment 24

The thermoset article of Embodiment 19 to 23 wherein the thermoset article exhibits a coefficient of friction of less than 0.3.

Embodiment 25

The thermoset articles of Embodiment 19 to 24 wherein the thermoset article is resistant to oxybenzone.

Embodiment 26

A thermoset article derived from the thermoformable article of Embodiment 15.

Embodiment 27

The thermoset article of Embodiment 26 wherein the thermoset article has a gloss at 60 degrees of greater than 15.

Embodiment 28

The thermoset article of any of the proceeding Embodiments, wherein the microsphere area coverage is 30-50% in some areas of the thermoset article and the pencil hardness in those areas is greater than or equal to 9 H at 7.5N.

Embodiment 29

The thermoset article of embodiments 1-27 wherein the microsphere area coverage is 30-50% in some areas of the thermoset article and the coefficient of friction in those areas is <0.3.

Embodiment 30

The thermoset article of embodiments 1-27 where the microsphere area coverage is 30-50% in some areas of the thermoset article and wherein the article is resistant to sunscreen.

Embodiment 31

The thermoset article of embodiments 1-27 where the microsphere area coverage is 30-50% in some areas of the thermoset article and the coefficient of friction in those areas is <0.3 and the pencil hardess is greater than or equal to 9 H at 7.5N

Embodiment 32

The thermoset article of embodiments 1-27, where the microsphere area coverage is 30-50% in some areas of the thermoset article and the pencil hardness in those areas is greater than or equal to 9 H at 7.5N; wherein the article is resistant to sunscreen.

Embodiment 33 the thermoset article of embodiments 1-27, where the microsphere area coverage is 30-50% in some areas of the thermoset article and the coefficient of friction in those areas is <0.3; wherein the article is resistant to sunscreen.

Embodiment 34 the thermoset article of embodiments 1-27, where the microsphere area coverage is 30-50% in some areas of the thermoset article and the pencil hardness in those areas is greater than or equal to 9 H at 7.5N and the coefficient of friction in those areas is <0.3; wherein the article is resistant to sunscreen.

Embodiment 35

The 3-dimensional shaped thermoset article of Embodiment 20, where the microsphere area coverage is 30-50% in some areas of the thermoset article and the pencil hardness in those areas is greater than or equal to 9 H at 7.5N.

Embodiment 36

The 3-dimensional shaped thermoset article of Embodiment 20, where the microsphere area coverage is 30-50% in some areas of the thermoset article and the coefficient of friction in those areas is <0.3.

Embodiment 37

The 3-dimensional shaped thermoset article of Embodiment 20, where the microsphere area coverage is 30-50% in some areas of the thermoset article and wherein the article is resistant to sunscreen.

Embodiment 38

The 3-dimensional shaped thermoset article of Embodiment 20, where the microsphere area coverage is 30-50% in some areas of the thermoset article and the coefficient of friction in those areas is <0.3 and the pencil hardness is greater than or equal to 9 H at 7.5N

Embodiment 39

The 3-dimensional shaped thermoset article of Embodiment 20, where the microsphere area coverage is 30-50% in some areas of the thermoset article and the pencil hardness in those areas is greater than or equal to 9 H at 7.5N; wherein the article is resistant to sunscreen.

Embodiment 40

The 3-dimensional shaped thermoset article of Embodiment 20, where the microsphere area coverage is 30-50% in some areas of the thermoset article and the coefficient of friction in those areas is <0.3; wherein the article is resistant to sunscreen.

Embodiment 41

The 3-dimensional shaped thermoset article of Embodiment 20, where the microsphere area coverage is 30-50% in some areas of the thermoset article and the pencil hardness in those areas is greater than or equal to 9 H at 7.5N and the coefficient of friction in those areas is <0.3; wherein the article is resistant to sunscreen.

Various modifications and alterations of this invention will become apparent to those skilled in the art without departing from the scope and spirit of this invention.

EXAMPLES

Materials

| Designation | Description |
| --- | --- |
| PI-1 | 2,2-Dimethoxy-1,2-diphenylethan-1-one, available under the trade designation of IRGACURE 651 from BASF Corporation, Vandalia, IL. This was used to make a 2.3 wt % solids solution of IRGACURE 651 in acetone. |
| PI-2 | A 45% solution of Bis 2,4,6 trimethylbenzoylpheyl phosphine oxide in water, available under the trade designation Irgacure 819DW, from BASF Corporation, Vandalia, IL |
| PI-3 | 2,2-Dimethoxy-1,2-diphenylethan-1-one, available under the trade designation of IRGACURE 651 from BASF Corporation, Vandalia, IL. This was used to make a 20.0 wt % solids solution of IRGACURE 651 in acetone. |
| PC 1 | A clear 5 mil polycarbonate film having a glass transition temperature of 153° C., available under the trade designation "LEXAN 8010" from SABIC Innovative Plastics, Pittsfield, MA. Prior to use this was corona treated under a nitrogen atmosphere at 500 milliJoules/square centimeter. |
| PC 2 | A clear 5 mil polycarbonate film having a glass transition temperature of 153° C., available under the trade designation "LEXAN 8010" from SABIC Innovative Plastics, Pittsfield, MA. Prior to use the polycarbonate was plasma treated generally as described in U.S. Pat. No. 8,634,146 at column 13, line 65 to column 14, line 30, with the following modifications. The width of the drum electrode was 108 cm (42.5 inches); the tetramethyl silane deposition step was not employed; during the treatment step 1000 standard cubic centimeters of nitrogen was used in place of oxygen, and the operating pressure was 90 milliTorr, and a plasma treatment time of 30 seconds. |
| CX-100 | A 100% active polyfunctional aziridine liquid crosslinker for use with water based acrylic emulsions or urethane dispersions, having an equivalent weight of 156, available under the trade designation of CX100, from DSM Neoresins, Waalwijk, The Netherlands. |
| WB 2812 | A 65% dispersion in water of a urethane acrylate oligomer, available under the trade designation of MIRAMER WB 2812, from Miwon Specialty Chemical Co., Ltd., South Korea. Based on NMR analysis, it is believed to contain a polycarbonate-polyester polyurethane with covalently attached acrylate functionality and with no significant free multifunctional acrylates. |
| ICN 1 | A solvent free, polyfunctional, aliphatic isocyanate resin based hexamethylene diisocyanate (HDI) having an equivalent weight of approximately 193, an NCO content of 21.8%, and a monomeric HDI content of 0.2% maximum, available under the trade designation DESMODUR N3300A from Bayer Materials Science LLC, Pittsburgh, PA. |
| ICN 2 | A liquid cycloaliphatic diisocyanate, dicyclohexylmethane diisocyanate, having an equivalent weight of 132 maximum, an NCO content of 31.8% minimum, and a solidification point of 25° C., available under the trade designation DESMODUR W from Bayer Materials Science LLC, Pittsburgh, PA. |
| BAYHYDROL UV 2689/1 | A40.8% solids anionic polyurethane dispersion, available under the trade designation BAYHYDROL UV 2689/1, from Bayer Material Science LLC, Pittsburgh, PA. Based on NMR analysis, it is believed to contain a branched acrylate functional polyester polyurethane structure as well as the free multifunctional acrylate (MFA) species dipentaerythritol hexaacrylate and ethoxylated trimethylolpropane triacrylate. The free acrylates are believed to represent ~55% of the solids. |
| BAYHYDROL UV 2282 | A 39% solids urethane acrylate dispersion available under the trade designation BAYHYDROL UV |

| Designation | Description |
|---|---|
| | 2282 from Bayer Material Science LLC, Pittsburgh, PA. Based on NMR analysis, it is believed to contain a polyester urethane with covalently attached multiacrylate functionality and with no significant free multifunctional acrylates. |
| BAYHYDROL UV XP2687 | A 48% solids urethane acrylate emulsion, available under the trade designation BAYHYDROL UV XP2687 from Bayer Material Science LLC, Pittsburgh, PA. |
| U9380 | A 32.5% solids, solvent-free, hard, aliphatic polyester-polyurethane dispersion, available under the trade designation ALBERDINGK U 9380 from Alberdingk Boley, Greensboro, North Carolina. The technical product literature makes no mention of acrylate functionality. |
| ICN 3 | A solvent free, water dispersible polyisocyanate, based on hexamethylenediisocyanate, with an equivalent weight of 243, available under the trade designation BAYHYDUR 302 from Bayer Materials Science LLC, Pittsburgh, PA. |
| ICN 4 | An isocyanate bearing urethane acrylate, available under the trade designation DESMOLUX D 100, from Bayer Materials Science LLC, Pittsburgh, PA, and an NCO content of 11.8 to 13.8%. |
| ICN 5 | A 3% solution wt/wt of IRGACURE 651 dissolved in DESMOLUX D100. |
| A1100 | Gamma-Aminopropyltriethoxysilane silane coupling agent,, available under the trade designation SILQUEST A1100 from Momentive Performance Materials, Inc., Waterford, NY. |
| POH 1 | Polytetramethylene ether glycol, a waxy solid having a molecular weight of 625-675, a hydroxyl number of 166-180, and a melting point of 11-19° C., available under the trade designation TERATHANE 650 from Invista, Wichita, KS. |
| POH 2 | A liquid diol having a molecular weight of 90 and a boiling point of 23° C., available as 1,4-butanediol from Chemtura Corporation, Middlebury, CT. |
| RM-8W | A 21.5% solids nonionic urethane rheology modifier, available under the trade designation ACRYSOL RM-8W, from Rohm and Haas, a subsidiary of the Dow Chemical Company, Midland, MI. |
| BYK 348 | A polyether modified silicone surfactant for aqueous coatings, available under the trade designation BYK 348, from BYK USA, Inc., Wallingford, CT |
| M600 | Dipentaerythritol hexaacrylate, available under the trade designation MIRAMER M600 from Miwon Specialty Chemical Co, Ltd. South Korea |
| U42 | A polyurethane dispersion available under the trade designation DISPERCOLL U42, from Bayer Material Science, Pittsburgh, PA. |
| T12 | Dibutyltin dilaurate (DBTDL), a liquid catalyst, available under the trade designation DABCO T-12 from Air Products and Chemicals, Incorporated, Allentown, PA. |
| Oxybenzone | 2-Hydroxy-4-Methoxybenzophenone, from Sigma Aldrich, Milwaukee, WI. |
| Octocrylene, | 2-ethylhexyl 2-cyano-3,3-diphenyl-2-propenoate, from Sigma Aldrich, Milwaukee, WI. |
| Octisalate, | 2-ethylhexyl salicylate, from Sigma Aldrich, Milwaukee, WI. |
| Homosalate | 3,3,5-Trimethylcyclohexyl 2-hydroxybenzoate, available as Homosalate, from Spectrum Chemical Manufacturing Corp., New Brunswick, NJ |
| Avobenzone | 1-(4-Methoxyphenyl)-3-(4-tert-butylphenyl)-propane-1,3-dione, available as Azobenzone from Sigma Aldrich, Milwaukee, WI. |
| Borosilicate glass powder | Milled borosilicate glass powder having a size distribution of less than 200 mesh (≤75 micrometers) and density of 2.23 g/cc, and a refractive index of 1.476, available under the trade designation PYREX 7740 from Strategic Materials Incorporated, Houston TX. |

Note:
The phrase "bead film laminate" and "microsphere laminate" are used interchangeably and refer to a construction comprising partially embedded microspheres (beads), a binder resin, and a substrate.

NMR Analysis of Dispersions

NMR analysis of BAYHYDROL UV 2689/1 indicates it contains a branched acrylate functional polyester polyurethane structure as well as the free multifunctional acrylate (MFA) species dipentaerythritol hexaacrylate and ethoxylated trimethylolpropane triacrylate. The free acrylates represent ~55% of the solids.

NMR analysis of BAYHYDROL 2282 indicates it contains a polyester urethane with covalently attached multiacrylate functionality. No significant free multifunctional acrylates were observed.

NMR analysis of MIRAMER WB-2812 indicates it contains a polycarbonate-polyester polyurethane with covalently attached acrylate functionality. No significant free multifunctional acrylates were observed.

Test Methods

Stain Resistance—Flat Polycarbonate Substrates

Stain resistance was evaluated by exposing bare polycarbonate film to either commercially available sunscreen or components of sunscreens. Table 1 below shows sunscreens and sunscreen components. For Controls 1 through 10, these were applied onto flat pieces of polycarbonate, which were taped onto a metal sheet. The sheet was then placed in a controlled heat and humidity chamber at 65° C./80% RH for three days with the sunscreen or sunscreen components face up, all samples side by side on a rack in the chamber. The samples were then removed, the sunscreen or component wiped off, and the surface cleaned as best possible with isopropyl alcohol and KIMWIPE brand tissues. The visual (by eye) appearance of the polycarbonate was recorded. If the surface looked materially the same as before testing (eg., no cracking or holes or hazing) a rating of "Pass" was assigned. If not a rating of "Fail" was assigned.

formed and UV cured. A 3.2 mm (0.013 inch) thick elastomeric foam having a density of about 0.25 g/cc was bonded to a flat steel substrate measuring 63.5 mm (2.5 inches) square, having a thickness of about 6 mm (0.024 inches), and weighing approximately 200 grams including the foam. Next, a microsphere film laminate having a length of 63.5 mm (2.5 inches) that was approximately 5 mm (0.20 inch) longer than the substrate was place over the foam covered surface of the substrate such that the film was wrapped around the leading edge of the substrate. This test article was placed with the film side down on an isopropyl alcohol wiped glass surface measuring at least 15.2 cm by 25.4 cm (6 inches by 10 inches). A table top peel tester was used in the coefficient of friction mode to pull the test article across the glass surface at a rate of about 2.29 meters/minute (90 inches/minute) for at least about 5 seconds. In this manner the entire area of the sample was evaluated. The transducer was calibrated with the force from the weight of the steel substrate with foam as 1.00. In this way pulling forces were directly read out as coefficient of friction (COF). The dynamic (kinetic) coefficient of friction was determined by evaluating the graph of the COF values beginning one second after the start of the measurement. Data was collected at a rate of ten readings/second and the average was recorded. Three samples were run for each film and the average of these three coefficient of friction measurements was reported. Values of 0.3 or less are desirable. The designation "COF 1" was used in reporting the results for those samples cut from the top of the thermoformed shape where the laminate was not strained and the % Area Bead Coverage was essentially unchanged from before thermoforming, and the designation "COF 2" was used for the results obtained from those samples cut from side of the

TABLE 1

| | Components | | | | |
| --- | --- | --- | --- | --- | --- |
| Sunscreen | Avobenzone % | Homosalate % | Octisalate % | Octocrylene % | Oxybenzone % |
| COPPERTONE SPORT 30 | 3 | 10 | 5 | 10 | 0 |
| COPPERTONE SPORT 50 | 3 | 11.7 | 4.5 | 4.5 | 5.4 |
| AVEENO PROTECT + HYDRATE 30 | 3 | 8 | 4 | 4 | 5 |
| HAWAIIAN TROPIC ISLAND SPORT 30 | 2 | 0 | 0 | 5 | 3 |
| NEUTROGENA BEACH DEFENSE 30 | 2.7 | 8 | 5 | 3.5 | 4 |

Stain Resistance—Thermoformed Bead Film Laminates

Stain resistance was evaluated by exposing bead film laminates to either COPPERTONE SPORT 50 or Oxybenzone. These were applied liberally to the corners and sides of the thermoformed laminates, some of which had been, UV cured, and placed in a 65° C., 80% Relative Humidity (RH) chamber for 72 hours, at which time they were removed, the COPPERTONE SPORT 50 or Oxybenzone was wiped off and cleaned with isopropanol. The shape was then inspected for swelling as indicated by a whitened appearance, cracks, and delamination. If no swelling, cracking, or delamination was observed the sample was assigned a rating of "Pass. If any of these were observed, it was rated "Fail".

Coefficient of Friction Testing

Samples were cut from the top and side of thermoformed microsphere film laminate samples, some of which had been UV cured. These samples were evaluated for coefficient of friction using a table top peel tester after they were thermothermoformed shape where the % Area Bead Coverage was reduced due to the strain of thermoforming.

Pencil Hardness

Samples were cut from the top and side of thermoformed microsphere film laminate samples, some of which had been UV cured. These samples were evaluated for pencil hardness according to ASTM D 3363 after they were thermoformed (according to the provisions in the table entitled "Thermoforming Data" below) and UV cured (according to the provisions in the table entitled "UV Curing Data" below). Abrasive sandpaper (Grit No. 400) was adhered to a flat and smooth benchtop with double coated tape. Pencil leads (Turquoise Premium pencil leads (9 H to 6 B in hardness) from Prismacolor Professional Art Supplies, a subsidiary of Newell Rubbermaid Office Products, Oak Brook, Ill.) Totiens Drawing Leads with mechanical lead holder) were held at an angle of 90° to the abrasive paper and abraded until a flat, smooth, circular cross-section was achieved, free of chips or nicks on the edge of the lead. The force on the tip of the pencil was fixed at 7.5 N. The microsphere film laminate was placed on a glass surface. Using a freshly prepared pencil lead for each test, the lead was pressed firmly against the film at a 45° angle and at the desired load using an Elcometer 3086 Motorised Pencil Hardness Tester (obtained from Elcometer Incorporated, Rochester Hills, Mich.) and drawn across the test panel in the "forward" direction for a distance of at least 0.635 cm (0.25 inch). Three pencil tracks were made for each grade of lead hardness. Prior to inspection, crumbled lead was removed from the test area using a damp paper towel wetted with isopropyl alcohol. The film was inspected by eye for defects and under an optical microscope (50×-1000× magnification) for the first 0.317 cm to 0.635 cm (0.125 inch to 0.25 inch) of each pencil track. Moving from harder leads to softer, the process was repeated down the hardness scale until a pencil was found that did not scratch the film or rupture it, or dislodge or partially dislodge any beads. At least two of three tracks at each lead hardness were required to meet these criteria in order to pass. The hardest level of lead that passed was reported as the pencil hardness of the film. Values of 3 H at a force of 5 Newtons, or harder, are desirable. Preference is given to microsphere films that have increasing pencil hardness values at a given load, e.g., for a load of 7.5 Newtons: 10 H>9 H>8 H>7 H>6 H>5 H>4 H>3 H. Pencil hardness testing was performed on the thermoformed articles in different areas of the thermoformed shape: on top where the laminate was not strained and the % Area Bead Coverage was essentially unchanged from before thermoforming, as well as on the side of the box near the bottom where the % Area Bead Coverage was reduced due to the strain of thermoforming. The designation "PH 1" was used in reporting the results for those samples cut from the top of the thermoformed shape where the laminate was not strained and the % Area Bead Coverage was essentially unchanged from before thermoforming, and the designation "PH 2" was used for the results obtained from those samples cut from side of the thermoformed shape, about 3 millimeters up the side of the thermoformed shape from the bottom of the shape where it met the flat land area, where the % Area Bead Coverage was reduced due to the strain of thermoforming.

Transmission, Haze, and Clarity

Total transmittance, haze, and clarity measurements were made using a BYK Haze-Gard Plus, Model No. 4725 (BYK-Gardner USA, Columbia, Md.), an integrating sphere instrument having 0°/diffuse geometry and CIE standard illuminant C. Film orientation was such that incident light beam from the instrument interacted with the microsphere-containing surface of the film. Samples were placed directly at the haze port for measurement of transmittance and haze and at the clarity port for measurement of clarity.

Calculation of % Area of Bead Coverage

Optical analysis was used to calculate the % area of bead coverage of thermoformed bead film laminates. Images were captured with bright field microscopy using a Keyence VHX-2000 series digital microscope (Keyence Corporation of America, Itasca, Ill.) in transmitted illumination mode at 200× magnification. Images were analyzed for areal bead coverage using the open source image processing software ImageJ (NIH, Bethesda, Md.—http://imagej.nih.gov/ij/). The software's automatic particle counting feature uses a binary image and provides information on the size of each particle and the overall area fraction in addition to a particle count. Bead area coverage was determined by means of the following steps: 1) a digital microscope image was captured, 2) simple thresholding was performed to segment image into two regions—the bead outline and the background, 3) the image was converted to a binary image by filling the area inside the bead outlines with black, 4) the overlapping or touching beads were separated using the Watershed separation function, and 5) the bead count and area coverage were determined using the Analyze Particles function.

Gloss

Thermoformed microsphere film laminates were evaluated for gloss in the middle of the land area surrounding the three dimensional shape, with the bead film laminate on a black background after UV curing of the thermoformed shape. The gloss in the land area appeared similar to the gloss of the top surface of the thermoformed shape. Gloss was measured at four different points each for angles of 60° and 85° using a micro-TRI-gloss meter (manufactured by BYK-Gardner Incorporated, Silver Spring, Md.). The average was recorded.

Method for Making Bead Film Carrier

Borosilicate Bead Carrier

Borosilicate glass powder was passed through a flame treater twice by passing them through a hydrogen/oxygen flame at a rate of 3 grams/minute to form microspheres and were collected in a stainless steel container whereupon metallic impurities were removed using a magnet. The resulting glass microspheres were treated with 600 ppm of SILQUEST A1100 in the following manner. The silane was dissolved in water, then added to the microsphere beads with mixing, air dried overnight, followed by drying at 110° C. for 20 minutes. The dried, silane treated microsphere beads were then sieved to remove any agglomerates and provide beads having a size of 75 micrometers or less and were free flowing. The resulting transparent silane treated microspheres were cascade coated using a mechanical sifter onto a transfer carrier comprising a polyethylene coated polyester substrate liner which had been preheated to about 140° C. (284° F.), to form a bead carrier having a uniform layer of transparent microspheres embedded in the polyethylene layer to a depth corresponding to about 30-40% of their diameter as determined by a magnifying imaging system.

Thermoforming of Bead Film Laminates

Figure 1B:
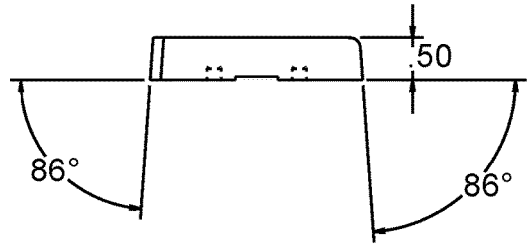
FIG. 1B is a side cross section view of one embodiment of a thermoset article according to the present disclosure.
Figure 1C:
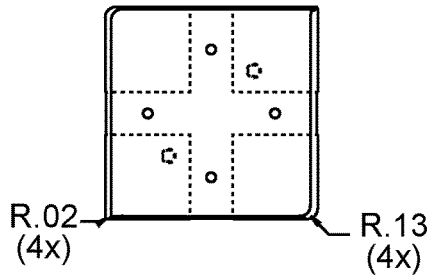
FIG. 1C is a top plan view of one embodiment of a thermoset article according to the present disclosure.
Figure 1D:
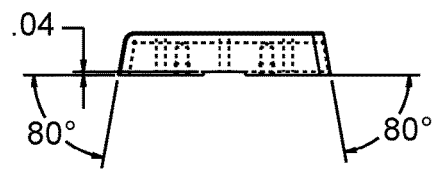
FIG. 1D is a side cross section view of one embodiment of a thermoset article according to the present disclosure.
Figure 1E:
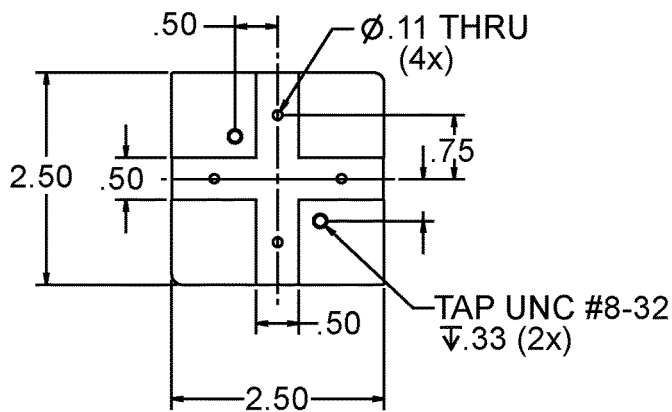
FIG. 1E is a top plan view of one embodiment of a thermoset article according to the present disclosure.

Thermoformable bead film laminates measuring 20.3 cm (8 inches) square were thermoformed at various temperatures using a COMET thermoformer (model C32.5S, MAAC Machinery Corporation, Carol Stream, Ill.). A male test mold having a 6.35 cm (2.50 inches) square base, a height of 1.27 cm (0.5 inches), and various radii and draft angles to its vertical sides was used to form the films into a five sided box (see FIGS. 1A to 1E). The following parameters were employed. The sheet temperature just before molding was measured using a laser sight equipped, portable non-contact (infrared) thermometer, commercially available under the trade designation "SCOTCHTRAK INFRARED HEAT TRACER IR-16L3" from 3M Company, St. Paul, Minn. Samples were rated "Pass" if no cracks observed in the thermoformed article; and "Fail" if cracking was observed in the thermoformed article.

TABLE 2

| Thermoforming Parameters | | | | | | | |
|---|---|---|---|---|---|---|---|
| Upper Radiant Oven Master Output (%) | Lower Radiant Oven Master Output (%) | Upper Radiant Oven Compensation (%) | Lower Radiant Oven Compensation (%) | Bead Film Laminate Preheat Temperature (° F.) | Oven Door Position | Vacuum (inches Hg) | Oven Return Delay (Seconds) |
| 55 | 55 | −35 | −45 | 310 | Closed | 30 | 5 |

UV Curing

UV curing was carried out using a HERAEUS NOBLELIGHT FUSION UV CURING SYSTEM (Heraeus Noblelight America LLC, Gaithersburg, Md.) equipped with an "H" bulb under nitrogen atmosphere at 30 feet per minute and 3 passes. The total combined energy from the three passes is reported in Table 3 below for UV-A, UV-B, UV-C, and UV-V wavelength ranges.

TABLE 3

| UV Range | Total Combined Energy (3 Passes) (milliJoules/square centimeter) |
|---|---|
| UV A | 1741 |
| UV B | 1443 |
| UV C | 332 |
| UV V | 1879 |

EXAMPLES

Controls 1-10

Controls 1-10 were evaluated for resistance to various sunscreens and sunscreen components as described in the Stain Resistance—Flat Polycarbonate Substrate test method above. The results are shown in Table 4 below.

TABLE 4

| Control | Sunscreen and/or Component | Result |
|---|---|---|
| 1 | COPPERTONE SPORT 30 | Fail |
| 2 | COPPERTONE SPORT 50 | Fail |
| 3 | AVEENO PROTECT + HYDRATE 30 | Fail |
| 4 | HAWAIIAN TROPIC ISLAND SPORT 30 | Fail |
| 5 | NEUTROGENA BEACH DEFENSE 30 | Fail |
| 6 | Avobenzone | Fail |
| 7 | Homosalate | Fail |
| 8 | Octisalate, 2-ethylhexyl salicylate | Pass |
| 9 | Octocrylene, 2-ethylhexyl 2-cyano-3,3-diphenyl-2-propenoate | Fail |
| 10 | Oxybenzone, 2-Hydroxy-4-Methoxybenzophenone | Fail |

All of the sunscreens, and all but one of the sunscreen components, detrimentally affected the surface and appearance of the flat polycarbonate film. Of the components, Octocrylene (2-ethylhexyl 2-cyano-3,3-diphenyl-2-propenoate) and Oxybenzone (2-Hydroxy-4-Methoxybenzophenone) were especially aggressive. COPPERTONE SPORT 50 and Oxybenzone were employed in the evaluation of bead film laminates.

Example 1

Part A—A coating solution was prepared by adding the following materials to a MAX 60 SPEEDMIXER cup (FlackTek, Incorporated, Landrum, S.C.): 32.51 grams of BAYHYDROL UV 2689/1, 0.15 grams of RM-8W, 0.31 grams of BYK 348, and 3.00 grams of a PI-1. These were mixed at 2900 rpm for 45 seconds in a DAC 150.1 FVZ-K SPEEDMIXER (FlackTek, Incorporated, Landrum, S.C.). Next, 0.3 grams of ICN 3 was added followed by mixing for an additional 45 seconds at 2900 rpm. The resulting binder resin mixture was coated over the exposed beaded surface of a Borosilicate Bead Carrier, measuring 12 inches wide, using a notchbar coater having a gap setting of 0.15 millimeters (0.006 inches) greater than the thickness of the bead carrier at a rate of about 3.0 meters/minute (10 feet/minute). The binder resin coated bead carrier was dried and cured at room temperature for 15 minutes and then 1 hour at 80° C. (176° F.) to provide a cured binder resin coated bead carrier.

Part B—A 100% solids two-part polyurethane was prepared by adding the following vacuum degassed materials to a MAX 60 SPEEDMIXER cup: 15.00 grams of a 5:95 (w/w) homogeneous blend of ICN 1 with ICN 2, 15.04 grams of POH 1, and 2.86 grams of POH 2. Vacuum was applied directly to the cup for 15 seconds and then mixed at 2600 rpm for 30 seconds under full vacuum in the SPEEDMIXER. The mixture was then removed from the SPEEDMIXER and 29.6 microliters T12 was added using a micropipette. The cup was again placed under vacuum for 15 seconds and mixed for an additional 30 seconds at 2600 rpm under full vacuum. The resulting mixture was coated between PC 1 film substrate and the exposed cured binder resin surface of the coated bead carrier of Part A, both measuring 30.5 centimeters (12 inches) wide, using a notchbar coater having a gap setting of 0.076 millimeters (0.003 inches) greater than the combined thickness of the film and bead carrier at a rate of about 3.0 meters/minute (10 feet/minute). This coated article was cured at room temperature for 2 hours then in five stages as follows: 60 minutes at 40° C. (104° F.); 60 minutes at 50° C. (122° F.); 60 minutes at 60° C. (140° F.); 60 minutes at 70° C. (158° F.); and finally for 60 minutes at 80° C. (176° F.).

A transfer laminate article having borosilicate beads which were partially embedded in polyethylene on one side and in the actinic radiation reactive polyurethane binder resin on the other side, and a coating of polyurethane resin between the binder resin layer and the PC substrate was obtained. Removal of the transfer carrier provided a bead film laminate having a thickness of 0.29 millimeters (0.011 inches). A sample of this bead film laminate was thermoformed followed by exposure to UV irradiation. This resulted in reaction of the actinically reactive crosslinker component and the acrylate functionality on the actinic radiation reactive polyurethane.

Example 2

Example 1 was repeated with the following modifications to Part A. A coating solution was prepared by adding the following materials to a MAX 60 SPEEDMIXER cup: 22.51 grams of BAYHYDROL UV 2689/1, 7.53 grams of U9380, 0.19 grams of RM-8W, 0.15 grams of BYK 348, and 2.95 grams of PI-1. These were then mixed at 2900 rpm for 45 seconds in the SPEEDMIXER. Next, 0.30 grams of ICN 3 was added followed by mixing for an additional 45 seconds at 2900 rpm.

The bead film laminate had a thickness of 0.33 millimeters (0.013 inches).

A sample of this bead film laminate was thermoformed, followed by exposure to UV irradiation.

Example 3

Part A—A coating solution was prepared by adding the following materials to a 2 liter plastic jug: 750 grams of BAYHYDROL UV 2689/1, 3.75 grams of RM-8W, 3.75 grams of BYK 348, and 73.37 grams of PI-1. These were mixed at 600 rpm for 3 minutes using an air mixer having propeller blades. To the mixture was added 7.63 grams of ICN 3, followed by mixing with the air mixer at 400 rpm for 10 minutes. The resulting binder resin mixture was coated over the exposed beaded surface of a Borosilicate Bead Carrier, using a notchbar coater having a gap setting of 0.15 millimeters (0.006 inches) greater than the thickness of the bead carrier at a rate of about 1.52 meters/minute (5 feet/minute). The binder resin coated bead carrier was dried and cured in 3 ovens set at 200° F., 215° F., and 250° F. for a total of 6.5 minutes to provide a cured binder resin coated bead carrier.

Part B—A coating solution was prepared by adding the following materials to a MAX 60 SPEEDMIXER cup: 32.51 grams of BAYHYDROL UV 2689/1, 0.15 grams of RM-8W, 0.31 grams of BYK 348, and 3.00 grams of PI-1. These were mixed at 2900 rpm for 45 seconds in using a SPEEDMIXER. Next, 0.3 grams of ICN 3 was added followed by mixing for an additional 45 seconds at 2900 rpm. The resulting mixture was applied to the exposed binder resin surface of the coated bead carrier of Part A using a notchbar coater having a gap setting of 0.15 millimeters (0.006 inches) greater than the thickness of the binder resin coated bead carrier at a rate of about 3.0 meters/minute (10 feet/minute). The two layer coated bead carrier was dried and cured at room temperature overnight followed by 40 minutes at 80° C. to provide a cured two layer binder resin coated bead carrier.

Part C—Less than 30 minutes after preparing the cured two layer binder resin coated bead carrier in Part B, it was heat laminated to a PC 1 film substrate using a hot roll laminator with a temperature setting of 250° F. (121° C.), and a setting of "1" on the laminator, a nip pressure of 448 KiloPascals (65 pounds/square inch), and a setting of "1" on the laminator (HL-101 Hot Roll Laminator, available from ChemInstruments, Inc., Fairfield, Ohio).

A transfer laminate article having borosilicate beads which were partially embedded in polyethylene on one side and in the actinic radiation reactive polyurethane binder resin on the other side, a second layer of actinic radiation reactive polyurethane between the binder resin layer and the PC film substrate was obtained. Removal of the transfer carrier liner provided a bead film laminate having a thickness of 0.29 millimeters (0.011 inches). This bead film laminate was heated at 90° C. (194° F.) for 45 minutes to minimize residual volatiles. A sample of this bead film laminate was thermoformed, followed by exposure to UV irradiation.

Example 4

Example 1 was repeated with the following modifications. For Part A, 70.01 grams of BAYHYDROL UV 2689/1, 0.36 grams of BYK-348, 0.35 grams of ACRYSOL RM-8W, 6.77 grams of PI-1, and 0.71 grams of ICN3 were employed and the coating gap was 0.014 inches (0.36 millimeters). For Part B a heat activated adhesive was used in place of the two part polyurethane. The heat activated adhesive was prepared as follows. To a glass jar were added 500 grams of U42 and 5 grams of RM-8W. The jar was sealed shut and placed on a roller mixer for two hours at room temperature. Just prior to use, 3.0 grams of ICN 3 was added to 100 grams of U42/RM-8W solution and mixed for one minute at 3000 rpm using a FlackTek SPEEDMIXER to give an adhesive precursor solution. The precursor solution was applied to the exposed surface of the binder resin layer of the coated bead carrier of Part A using a notchbar coater having a gap setting of 0.15 millimeters (0.006 inches) greater than the thickness of the bead carrier at a rate of about 3.0 meters/minute (10 feet/minute). The resulting article was dried and cured at room temperature for 1hr at 60° C. (176° F.).

The binder resin coated bead carrier with heat activated adhesive was heat laminated to a PC 2 film substrate using a hot roll laminator as described in Example 3, part C.

A transfer laminate article having borosilicate beads which were partially embedded in polyethylene on one side and in the actinic radiation reactive polyurethane binder resin on the other side, a layer of heat activated polyurethane adhesive between the binder resin layer and the PC substrate was obtained. Removal of the transfer carrier provided a bead film laminate having a thickness of 0.31 millimeters (0.012 inches). This bead film laminate was heated at 90° C. (194° F.) for 45 minutes to minimize residual volatiles. A sample of this bead film laminate was thermoformed (followed by exposure to UV irradiation.

Example 5

A coating solution was prepared by adding the following materials to an 18.0 liter (5 gallon) pail: 2056 grams of BAYHYDROL UV 2689/1, 108.3 grams BAYHYDROL UV XP2687, 11.08 grams of RM-8W, 21.38 grams of BYK 348, and 209.1 grams of PI-1. The pail contents were mixed with a paint stick during slow addition and then for an additional for 10 minutes. To the mixture was added 21.6 grams of ICN 3 followed by further mixing for 10 minutes. After about 60 minutes resulting binder resin mixture was applied on a Borosilicate Bead Carrier, measuring 12 inches wide, using a notchbar coater having a gap setting of 0.178 millimeters (0.007 inches) greater than the thickness of the bead carrier at a rate of about 1.52 meters/minute (5 feet/minute). The binder resin coated bead carrier was then dried and cured in 3 ovens set at 70° C., 80° C., and 120° C. (158° F., 176° F., and 248° F.) over a total of 5 minutes to provide a cured binder resin coated bead carrier. Upon exiting the ovens the cured binder resin coated bead carrier was laminated to 0.13 millimeter (0.005 inches) PC 1 film substrate at a temperature of 60° C. (140° F.), and a pressure of 400 KiloPascals (58 pounds/square inch). The sample sat for about 72 hours after which the transfer carrier was removed to provide a bead film laminate having a thickness of 0.29 millimeters (0.011 inches). This bead film laminate was heated at 80° C. (176° F.) for 60 minutes to minimize residual volatiles. A sample of this bead film laminate was thermoformed followed by exposure to UV irradiation.

Example 6

Example 1 was repeated with the following modifications to Part A. 30.00 g BAYHYDROL UV 2689/1 was employed instead of 32.51 g. 2.92 grams of PI-1 was used in place of 3.00 grams PI-1 and 0.06 g CX-100 was added in place of 0.3 g ICN3. In Part B, PC 2 was used in place of PC 1.

A transfer laminate article having borosilicate beads which were partially embedded in polyethylene on one side and in the actinic radiation reactive polyurethane binder resin on the other side, and a coating of polyurethane resin between the binder resin layer and the PC substrate was obtained. Removal of the transfer carrier provided a bead film laminate having a thickness of 0.29 millimeters (0.011 inches). A sample of this bead film laminate was thermoformed, followed by exposure to UV irradiation.

Example 7

Example 1 was repeated with the following modification. 30.00 grams BAYHYDROL UV 2689/1 was employed instead of 32.51 grams. No ICN 3 was used in Part A. In Part B, PC2 was used in place of PC 1.

A transfer laminate article having borosilicate beads which were partially embedded in polyethylene on one side and in the actinic radiation reactive polyurethane binder resin on the other side, and a coating of polyurethane resin between the binder resin layer and the PC substrate was obtained. Removal of the transfer carrier provided a bead film laminate having a thickness of 0.29 millimeters (0.011 inches). A sample of this bead film laminate was thermoformed followed by exposure to UV irradiation.

Example 8

Example 1 was repeated with the following modification to Part A. A coating solution was prepared by adding the following materials to a MAX 60 SPEEDMIXER cup: 30.01 grams of BAYHYDROL UV 2282, 0.15 grams of RM-8W, 0.31 grams of BYK 348, and 2.92 grams of PI-1. These were mixed at 2900 rpm for 45 seconds in the SPEEDMIXER followed by the addition and mixing of 0.58 grams of ICN 3. In Part B, PC 2 was used in place of PC 1.

A transfer laminate article having borosilicate beads which were partially embedded in polyethylene on one side and in the actinic radiation reactive polyurethane binder resin on the other side, and a coating of polyurethane resin between the binder resin layer and the PC substrate was obtained. Removal of the transfer carrier provided a bead film laminate having a thickness of 0.29 millimeters (0.011 inches). A sample of this bead film laminate was thermoformed followed by exposure to UV irradiation.

Example 9

Example 1 was repeated with the following modifications. 30.01 grams of BAYHYDROL UV 2689/1 was employed. A transfer laminate article having borosilicate beads which were partially embedded in polyethylene on one side and in the actinic radiation reactive polyurethane binder resin on the other side, and a coating of polyurethane resin between the binder resin layer and the PC substrate was obtained. Removal of the transfer carrier provided a bead film laminate having a thickness of 0.29 millimeters (0.011 inches). A sample of this bead film laminate was thermoformed as described in "Thermoforming of Bead Film Laminates with the following modification. The height of the mold was 3.81 centimeters (1.5 inches). After thermoforming, the sample was exposed to UV irradiation.

Example 10

Example 1 was repeated with the following modifications. 30.03 grams of BAYHYDROL UV 2689/1 was employed. A transfer laminate article having borosilicate beads which were partially embedded in polyethylene on one side and in the actinic radiation reactive polyurethane binder resin on the other side, and a coating of polyurethane resin between the binder resin layer and the PC substrate was obtained. Removal of the transfer carrier provided a bead film laminate having a thickness of 0.29 millimeters (0.011 inches). The flat film sample was exposed to UV irradiation.

Example 11

Part A—A coating solution was prepared by adding the following materials to a 2 liter plastic jug: 660.2 grams of BAYHYDROL UV 2689/1 and 342.3 grams of U9380. The mixture was slowly hand mixed using a paint stick for 10 minutes. Next, 10.4 grams of BYK 348 were added to the mixture and hand mixed with a paint stick for 5 minutes. This was followed by slowly adding 10.00 grams of PI-3 to the mixture while stirring with the paint stick and mixed for a total of 5 minutes. The solution sat overnight and exhibited no noticeable change the next day.

To this mixture was added 10.00 grams of ICN 3, followed by mixing with the air mixer at 350 rpm for 10 minutes. The resulting binder resin mixture was coated over the exposed beaded surface of a Borosilicate Bead Carrier, using a notchbar coater having a gap setting of 0.15 millimeters (0.006 inches) greater than the thickness of the bead carrier at a rate of about 1.52 meters/minute (5 feet/minute). The binder resin coated bead carrier was dried and cured in 3 ovens set at 180° F., 200° F., and 230° F. (82° C., 93° C., and 110° C. respectively) for a total of 6.5 minutes to provide a cured binder resin coated bead carrier. Part B—A 100% solids two-part polyurethane was prepared by adding the following vacuum degassed materials to a MAX 60 SPEEDMIXER cup: 15.00 grams of a homogeneous blend of ICN 1:ICN 2/5:95 (w/w), 15.02 grams of POH 1, and 2.88 grams of POH 2. Vacuum was applied directly to the cup for 15 seconds and followed by mixing at 2600 rpm for 30 seconds under full vacuum in the SPEEDMIXER. The mixture was then removed from the SPEEDMIXER and 30.0 microliters T12 was added using a micropipette. The cup was again placed under vacuum for 15 seconds and mixed for an additional 30 seconds at 2600 rpm under full vacuum. The resulting mixture was coated between PC 2 film substrate and the exposed cured binder resin surface of the coated bead carrier of Part A, both measuring 30.5 centimeters (12 inches) wide, using a notchbar coater having a gap setting of 0.10 millimeters (0.004 inches) greater than the combined thickness of the film and bead carrier at a rate of about 3.0 meters/minute (10 feet/minute). This coated article was cured at room temperature for 2 hours then in five stages as follows: 60 minutes at 40° C. (104° F.); 60 minutes at 50° C. (122° F.); 60 minutes at 60° C. (140° F.); 60 minutes at 70° C. (158° F.); and finally for 60 minutes at 80° C. (176° F.).

A transfer laminate article having borosilicate beads which were partially embedded in polyethylene on one side and in the actinic radiation reactive polyurethane binder resin on the other side, and a coating of polyurethane resin between the binder resin layer and the PC substrate was obtained. Removal of the transfer carrier provided a bead film laminate having a thickness of 0.35 millimeters (0.014 inches). A sample of this bead film laminate was thermoformed followed by exposure to UV irradiation. This resulted in reaction of the actinically reactive crosslinker component and the acrylate functionality on the actinic radiation reactive polyurethane.

Comparative Example 1

A 100% solids two-part polyurethane was prepared by adding the following vacuum degassed materials to a MAX 60 SPEEDMIXER cup: 15.00 grams of a 5:95 (w/w) homogeneous blend of ICN 1 with ICN 2, and 15.04 grams of POH 1, and 2.86 grams of POH 2. Vacuum was applied directly to the cup for 15 seconds and then mixed at 2600 rpm for 30 seconds under full vacuum in a SPEEDMIXER. Next, 29.6 microliters T12 was added using a micropipette. The cup was again placed under vacuum for 15 seconds and mixed for an additional 30 seconds at 2600 rpm under full vacuum. The resulting mixture was coated between a Borosilicate Bead Carrier and a PC 2 film substrate, both measuring 30.5 centimeters (12 inches) wide, using a notchbar coater having a gap setting of 0.076 millimeters (0.003 inches) greater than the combined thickness of the bead carrier and PC film at a rate of about 3.0 meters/minute (10 feet/minute). The coated precursor was cured at room temperature for 2 hours then in five stages as follows: 60 minutes at 40° C. (104° F.); 60 minutes at 50° C. (122° F.); 60 minutes at 60° C. (140° F.); 60 minutes at 70° C. (158° F.); and finally for 60 minutes at 80° C. (176° F.).

A transfer laminate article having borosilicate beads which were partially embedded in polyethylene on one side and in the polyurethane binder resin on the other side, and having a PC substrate film on the side of the binder resin layer opposite that in contact with the beads was obtained. Removal of the transfer carrier provided a bead film laminate having a thickness of 0.29 millimeters (0.011 inches). A sample of this bead film laminate was thermoformed.

Comparative Example 2

A 100% solids two-part polyurethane was prepared by adding the following vacuum degassed materials to a MAX 60 SPEEDMIXER cup: 9.00 grams ICN 2, 0.59 grams ICN 1, 2.47 grams ICN 5, 10.57 grams POH 1, and 2.05 grams POH 2. Vacuum was applied directly to the cup for 15 seconds and then mixed at 2600 rpm for 30 seconds under full vacuum in a SPEEDMIXER. Next, 23 microliters T12 was added using a micropipette. The cup was again placed under vacuum for 15 seconds and mixed for an additional 30 seconds at 2600 rpm under full vacuum. The resulting mixture was coated between a Borosilicate Bead Carrier and PC 2 film substrate and cured as described in Comparative Example 1.

A transfer laminate article having borosilicate beads which were partially embedded in polyethylene on one side and in the actinic radiation reactive polyurethane on the other side, and having a PC substrate film on the side of the binder resin layer opposite that in contact with the beads was obtained. Removal of the transfer carrier provided a bead film laminate having a thickness of 0.28 millimeters (0.010 inches). A sample of this bead film laminate was thermoformed followed by exposure to UV irradiation.

Comparative Example 3

A 100% solids two-part polyurethane was prepared by adding the following vacuum degassed materials to a MAX 60 SPEEDMIXER cup: 0.61 grams ICN 1, 9.01 grams ICN 2, 2.49 grams ICN 5, 10.56 grams POH 1, 2.02 grams POH 2, and 9.83 grams M600. Vacuum was applied directly to the cup for 15 seconds and then mixed at 2600 rpm for 30 seconds under full vacuum in a SPEEDMIXER. Next, 31 microliters T12 was added using a micropipette. The cup was again placed under vacuum for 15 seconds and mixed for an additional 30 seconds at 2600 rpm under full vacuum. The resulting mixture was coated between a Borosilicate Bead Carrier and PC 2 film substrate and cured as described in Comparative Example 1

A transfer laminate article having borosilicate beads which were partially embedded in polyethylene on one side and in the actinic radiation reactive polyurethane on the other side, and having a PC substrate film on the side of the binder resin layer opposite that in contact with the beads was obtained. Removal of the transfer carrier provided a bead film laminate having a thickness of 0.29 millimeters (0.011 inches). A sample of this bead film laminate was thermoformed followed by exposure to UV irradiation.

Comparative Example 4

Example 1 was repeated with the following modification. The coating solution use in Part A was prepared using 30.02 grams BAYHYDROL UV 2689/1 instead of 32.51 grams and 0.45 grams PI-2 in place of PI-1. Removal of the transfer carrier provided a bead film laminate having a thickness of 0.29 millimeters (0.011 inches). A sample of this bead film laminate was thermoformed.

Comparative Example 5

Example 1 was repeated with the following modification. The coating solution use in Part A was prepared using 30.02 grams BAYHYDROL UV 2689/1 instead of 32.51 grams and the amount of ICN 3 in the was 0.61 grams. Removal of the transfer carrier provided a bead film laminate having a thickness of 0.29 millimeters (0.011 inches). A sample of this bead film laminate was thermoformed.

Comparative Example 6

Example 1 was repeated with the following modification. The coating solution used in Part A was made using 30.02 grams of WB 2812 in place of BAYHYDROL UV 2689/1 and the amount of ICN 3 was changed to 0.60 grams. In Part B, PC 2 was used in place of PC 1. Removal of the transfer carrier provided a bead film laminate having a thickness of 0.34 millimeters (0.013 inches). A sample of this bead film laminate was thermoformed followed by exposure to UV irradiation.

Comparative Example 7

Example 6 was repeated with the following modification: 0.3 g of CX-100 was used in Part A instead of 0.06 g of CX-100.

A transfer laminate article having borosilicate beads which were partially embedded in polyethylene on one side and in the actinic radiation reactive polyurethane binder resin on the other side, and a coating of polyurethane resin between the binder resin layer and the PC substrate was obtained. Removal of the transfer carrier provided a bead film laminate having a thickness of 0.36 millimeters (0.014 inches). A sample of this bead film laminate was thermoformed.

Comparative Example 8

Example 1 was repeated with the following modifications. 30.02 g of BAYHYDROL UV 2689/1 was employed. A transfer laminate article having borosilicate beads which were partially embedded in polyethylene on one side and in the actinic radiation reactive polyurethane binder resin on the other side, and a coating of polyurethane resin between the binder resin layer and the PC substrate was obtained. Removal of the transfer carrier provided a bead film laminate having a thickness of 0.29 millimeters (0.011 inches).

A sample of this bead film laminate was exposed to UV irradiation, followed by thermoforming.

The binder resin layers described in the Examples and Comparative Examples in some cases contain free multifunctional acrylates (MFA) (e.g. dipentaerythritol hexaacrylate) either as part of the polyurethane dispersion or as a separate additive (e.g. M600). These free multifunctional acrylates are actinically reactive crosslinkers. The free multifunctional acrylates and acrylate functionality attached to the polyurethane in the dispersions are actinically reactive and remain unreacted until UV exposure. For each composition, the percent free MFA in the binder resin (prior to UV exposure) was based on the solids content (i.e., excluding solvent) and is reported in Table 5.

The binder resin layers used in the Examples and Comparative Examples also include various levels of thermally activated crosslinkers (ICN 3 and CX 100). For each composition, the percent of these crosslinkers was based on the solids content (i.e., excluding solvent) and is reported in Table 5.

the side of the formed shape from the bottom of the shape, the % area bead coverage level was approximately 45%.

The thermoformed bead laminate of Example 9 was evaluated for % area bead coverage as described in the test methods. It was found that, at about 7 millimeters up the side of the formed shape from the bottom of the shape, the % area bead coverage level was approximately 36.8%.

Where reported, the PH 1 and COF 1 were measured on the top of the thermoformed shape. For Examples 1, 2, 5, 6, and 7, PH 2 was measured on the side of the formed shape where bead area coverage was lower. COF 2 was measured on the side of the shape, where bead area coverage was lower.

For Example 9, the PH 1 and COF 1 were measured on the top of the thermoformed shape. In addition, PH 2 was measured on the side of the shape, approximately 7 millimeters up the side of the formed shape from the bottom of the shape, where bead area coverage was lower. COF 2 was measured on the side of the shape, where bead area coverage was lower.

Comparative Example 4 is believed to have failed thermoforming due to thermal decomposition of the photoinitiator used, which resulted in premature crosslinking. As a result it was not exposed to UV irradiation.

Comparative Example 5 is believed to have failed thermoforming due to the use of increased amount of the thermally activated crosslinker, ICN3. As a result it was not exposed to UV irradiation.

TABLE 5

Results

| Ex. | % free MFA in binder resin | % ICN 3 in binder resin | % CX100 in binder resin | Thermoforming Temperature (° F.) | Thermoforming results | CT50 | OXB | PH 1 | PH 2 | COF 1 | COF 2 | 60 Degree Gloss | 85 Degree Gloss |
|---|---|---|---|---|---|---|---|---|---|---|---|---|---|
| 1 | 52.2 | 2.1 | 0 | 346 | Pass | Pass | Pass | 9H | 9H | 0.168 | 0.172 | 8.9 | 1.8 |
| 2 | 41.4 | 2.5 | 0 | 338 | Pass | ND | Pass | 9H | 9H | ND | ND | ND | ND |
| 3 | 52.6 | 2.4 | 0 | 342 | Pass | Pass | Pass | 9H | ND | ND | ND | 9.7 | 1.7 |
| 4 | 52.6 | 2.4 | 0 | 330 | Pass | Pass | Pass | ND | ND | ND | 0.164 | 9.2 | 1.8 |
| 5 | N.D. | 2.3 | 0 | 337 | Pass | Pass | Pass | 9H | 9H | 0.195 | ND | 11.4 | 2 |
| 6 | 53.0 | 0 | 0.5 | 340 | Pass | Pass | Pass | 9H | 9H | 0.194 | ND | 9.3 | 1.8 |
| 7 | 53.2 | 0 | 0 | 348 | Pass | Pass | Fail | 9H | 9H | 0.148 | ND | 18.9 | 6 |
| 8 | 0 | 4.6 | 0 | 337 | Pass | Pass | Fail | 9H | ND | 0.16 | ND | 9.4 | 1.9 |
| 9 | 52.0 | 2.3 | 0 | 347 | Pass | Pass | Fail | 9H | 9H | 0.157 | 0.14 | ND | ND |
| 10 | 52.0 | 2.3 | 0 | N.A. | N.A. | Pass | Pass | 9H | NA | 0.195 | NA | ND | ND |
| 11 | 36.8 | 2.5 | 0 | 353 | Pass | ND | Pass | 9H | ND | 0.167 | ND | ND | ND |
| CE 1 | 0 | 0 | 0 | 335 | Pass | Fail | Fail | ND | ND | ND | ND | 9.3 | 1.7 |
| CE 2 | 0 | 0 | 0 | 340 | Pass | Fail | Fail | ND | ND | ND | ND | 8.7 | 1.9 |
| CE 3 | 28.5 | 0 | 0 | 340 | Pass | ND | Fail | ND | ND | ND | ND | ND | ND |
| CE 4 | 51.4 | 2.3 | 0 | 332 | Fail | ND | ND | ND | ND | ND | ND | ND | ND |
| CE 5 | 50.8 | 4.6 | 0 | 347 | Fail | ND | ND | ND | ND | ND | ND | ND | ND |
| CE 6 | 0 | 5.2 | 0 | 338 | Pass | Fail | Fail | ND | ND | ND | ND | 8.1 | 1.7 |
| CE 7 | 52.0 | 0 | 2.3 | 335 | Fail | ND | ND | ND | ND | ND | ND | ND | ND |
| CE 8 | 52.0 | 2.3 | 0 | 337 | Fail | ND | ND | ND | ND | ND | ND | ND | ND |

CT50: COPPERTONE SPORT 50
OXB: Oxybenzone
C.E.: Comparative Example
ND: not determined
NA: not applicable The thermoformed bead laminate of Example 1 was evaluated for % area bead coverage as described in the test methods. Near the outer edge of the unformed land area surrounding the thermoformed shape the % area of bead coverage was found to be 68.3%, while the coverage at the top of the formed shape away from the edges was found to be 67.9%%. It was also found that, at about 3 millimeters up Comparative Example 7 is believed to have failed thermoforming due to the use of increased amounts of the thermally activated crosslinker CX-100. As a result it was not exposed to UV irradiation.

Comparative 8 is believed to have failed thermoforming due to UV exposure prior to thermoforming. Such exposure results in reaction of the actinically reactive crosslinking component (multifunctional acrylates (MFA)) which results in a thermoset composition.

TABLE 6

| | Results | | |
|---|---|---|---|
| Ex. | % Transmittance | % Haze | % Clarity |
| 1 | 99.1 | 93.5 | 17.6 |
| 2 | 93.8 | 93.3 | 9.8 |
| 3 | 97.3 | 96.4 | 11.3 |
| 4 | 96.8 | 95.6 | 9.9 |
| 5 | 93.4 | 81.7 | 15.4 |
| 6 | 93.0 | 93.1 | 26.3 |
| 7 | 92.0 | 62.6 | 38 |
| C.E. 1 | 100 | 92.9 | 16.5 |
| C.E. 2 | 89.5 | 100 | 7.4 |

C.E.: Comparative Example

Example 7, which did not contain a thermally activated crosslinker, passes the thermoforming test, as well as the pencil hardness (PH 1 and PH 2), COF 1, and COPPERTONE 50 stain tests. However it fails the Oxybenzone stain test. This is believed to be due to the lack of a thermally activated crosslinker.

It is notable that the clarity is significantly higher for example 7 (and the haze appreciably lower), This is also believed to be due to the lack of a thermally activated crosslinker.

The invention claimed is:

1. An article comprising at least a first surface having:
   (a) a binder resin layer comprising an actinic radiation reactive polyurethane dispersion, said polyurethane dispersion further comprising multifunctional acrylates, wherein the binder resin layer has a first major surface opposite a second major surface, wherein the actinic radiation reactive polyurethane dispersion is derived from a reaction product of polyester polyol, diisocyanates and triisocyanates, dihydroxy containing carboxylic acid;
   (b) a plurality of microspheres partially embedded and adhered to the first major surface of the binder resin layer; and
   (c) a thermally activated crosslinker.

2. The article of claim 1 wherein the article is thermoformable.

3. The article of claim 1 wherein the polyurethane dispersion has a pH of greater than or equal to 6.5.

4. The article of claim 1 wherein the polyurethane dispersion has a pH of less than or equal to 10.0.

5. The article of claim 1 wherein the thermally activated crosslinker is selected from at least one of polyisocyanate and polyaziridine.

6. The article of claim 1 further comprising a photoinitiator.

7. The article of claim 1 further comprising at least one additive.

8. The article of any claim 7 wherein the at least one additive is selected from at least one of a thickening agent, wetting agent, UV stabilizer, leveling agent.

9. The article of claim 1, wherein the article is thermally cured.

10. The article of claim 1 wherein the plurality of microspheres are selected from at least one of glass, polymers, glass ceramics, ceramics, metals and combinations thereof.

11. The article of claim 1 wherein at least about 60% of the surface of the article is covered with the plurality of microspheres.

12. The article of claim 1, wherein the plurality of microspheres are substantially embedded in the binder resin layer.

13. The article of claim 1 further comprising a reinforcing layer disposed along the second major surface of the binder resin layer.

14. The article of claim 13 wherein the reinforcing layer comprises at least one of polyurethane resins, acrylic resins, polyester resins, epoxy resins, and combinations thereof.

15. The article of claim 14 wherein the polyurethane material is selected from polyurethane dispersions, two part urethanes coated from solvent, 100% solids two part urethanes, and combinations thereof.

16. A thermoset article derived from the thermoformable article of claim 2.

17. The thermoset article of claim 16 wherein curing is accomplished by actinic radiation curing.

18. A thermoset article derived from the thermoformable article of claim 12.

19. An article comprising at least a first surface having:
   (a) a binder resin layer comprising an actinic radiation reactive polyurethane dispersion, said polyurethane dispersion further comprising multifunctional acrylates, wherein the binder resin layer has a first major surface opposite a second major surface, wherein the binder resin layer comprises at least 35% w/w free multifunctional acrylate and less than 3% polyisocyanate;
   (b) a plurality of microspheres partially embedded and adhered to the first major surface of the binder resin layer; and
   (c) a thermally activated crosslinker.

* * * * *